(12) United States Patent
Isogawa et al.

(10) Patent No.: US 8,399,563 B2
(45) Date of Patent: *Mar. 19, 2013

(54) GOLF BALL

(75) Inventors: Kazuhiko Isogawa, Kobe (JP);
 Tsutomu Hirau, Kobe (JP); Satoko Okabe, Kobe (JP)

(73) Assignee: SRI Sports Limited, Kobe (JP)

( * ) Notice: Subject to any disclaimer, the term of this patent is extended or adjusted under 35 U.S.C. 154(b) by 639 days.

This patent is subject to a terminal disclaimer.

(21) Appl. No.: 12/574,408

(22) Filed: Oct. 6, 2009

(65) Prior Publication Data

US 2010/0087275 A1    Apr. 8, 2010

(30) Foreign Application Priority Data

Oct. 8, 2008 (JP) ................................ 2008-262043
Oct. 16, 2008 (JP) ................................ 2008-267913

(51) Int. Cl.
 *A63B 37/12* (2006.01)
 *A63B 37/00* (2006.01)
 *C08L 33/02* (2006.01)
 *C08L 77/00* (2006.01)

(52) U.S. Cl. ........ 525/179; 525/182; 525/183; 473/373; 473/374; 473/376; 473/378; 473/385

(58) Field of Classification Search .................. None
 See application file for complete search history.

(56) References Cited

U.S. PATENT DOCUMENTS

| | | | |
|---|---|---|---|
| 5,091,478 A * | 2/1992 | Saltman ........................ | 525/179 |
| 5,210,138 A | 5/1993 | Yamamoto et al. | |
| 5,789,021 A * | 8/1998 | Dooms et al. .................. | 427/64 |
| 5,919,862 A | 7/1999 | Rajagopalan | |
| 5,977,264 A | 11/1999 | Ichikawa et al. | |
| 6,042,488 A | 3/2000 | Sullivan et al. | |
| 6,187,864 B1 | 2/2001 | Rajagopalan | |
| 6,274,669 B1 | 8/2001 | Rajagopalan | |
| 6,277,035 B1 | 8/2001 | Sullivan et al. | |
| 6,353,058 B1 | 3/2002 | Rajagopalan | |
| 6,702,694 B1 | 3/2004 | Watanabe | |
| 6,958,379 B2 | 10/2005 | Wu et al. | |
| 7,393,288 B2 | 7/2008 | Egashira et al. | |
| 2003/0153403 A1 | 8/2003 | Endo et al. | |
| 2004/0010096 A1 | 1/2004 | Rajagopalan et al. | |
| 2004/0116211 A1 | 6/2004 | Sullivan et al. | |
| 2004/0142770 A1 | 7/2004 | Watanabe | |
| 2004/0232590 A1* | 11/2004 | Iwami et al. .................. | 264/248 |
| 2004/0235587 A1* | 11/2004 | Sullivan et al. ............... | 473/371 |
| 2004/0266557 A1 | 12/2004 | Ohama | |
| 2005/0119451 A1 | 6/2005 | Wu et al. | |
| 2006/0293121 A1 | 12/2006 | Egashira et al. | |
| 2007/0232413 A1 | 10/2007 | Tarao et al. | |
| 2008/0161129 A1 | 7/2008 | Okabe | |
| 2008/0227569 A1 | 9/2008 | Egashira et al. | |
| 2009/0280927 A1* | 11/2009 | Sullivan et al. ............... | 473/374 |
| 2010/0167840 A1* | 7/2010 | Hirau et al. ................... | 473/373 |

FOREIGN PATENT DOCUMENTS

| | | |
|---|---|---|
| GB | 2 267 908 A | 12/1993 |
| JP | 60-60867 A | 4/1985 |
| JP | 62-22841 A | 1/1987 |
| JP | 3-64343 A | 3/1991 |
| JP | 6-80718 A | 3/1994 |
| JP | 9-10357 A | 1/1997 |
| JP | 9-70451 A | 3/1997 |
| JP | 10-127822 A | 5/1998 |
| JP | 10-314341 A | 12/1998 |
| JP | 11-137726 A | 5/1999 |
| JP | 11-347151 A | 12/1999 |
| JP | 2001-509204 A | 7/2001 |
| JP | 2001-514561 A | 9/2001 |
| JP | 2002-348466 A | 12/2002 |
| JP | 2003-504089 A | 2/2003 |
| JP | 2003-199846 A | 7/2003 |
| JP | 2004-97802 A | 4/2004 |
| JP | 2004-188207 A | 7/2004 |
| JP | 2004-305755 A | 11/2004 |
| JP | 2005-13455 A | 1/2005 |
| JP | 2005-28153 A | 2/2005 |
| JP | 2006-192268 A | 7/2006 |
| JP | 2007-622 A | 1/2007 |
| JP | 2007-267840 A | 10/2007 |
| JP | 2008-178683 A | 8/2008 |
| WO | WO 99/08756 A1 | 2/1999 |

OTHER PUBLICATIONS

An English translation of an Office Action for Japanese Application No. 2008-267913, dated Jan. 10, 2012.
English Translation of Japanese Office Action dated Apr. 19, 2011 for Application No. 2008-335264.
English Translation of Japanese Office Action dated Jun. 17, 2012 for Application No. 2008-335264.

* cited by examiner

*Primary Examiner* — David Buttner
(74) *Attorney, Agent, or Firm* — Birch, Stewart, Kolasch & Birch, LLP

(57) ABSTRACT

An object of the invention is to provide a golf ball excellent in the durability at the normal and low temperatures, flight distance, and shot feeling on the shots. Another object of the present invention is to provide a golf ball excellent in a direction stability on the shots. The present invention provides a golf ball comprising: a core consisting of at least one layer; and a cover covering the core and having a thickness ranging from 0.3 mm to 1.0 mm, wherein the cover is formed from a cover composition that contains as a resin component, (A) a highly elastic polyamide resin (B) a metal-neutralized product of binary copolymer and/or ternary copolymer, and (C) a resin having a polar functional group in a specific amount, and wherein the cover composition has a slab hardness ranging from 65 to 75 in Shore D hardness.

19 Claims, 3 Drawing Sheets

US 8,399,563 B2

GOLF BALL

FIELD OF THE INVENTION

The present invention relates to a golf ball, in particular, to a technology for improving a flight distance and a shot feeling while maintaining durability at normal and low temperatures. The present invention also relates to a technology for improving a flight distance, a direction stability, and a shot feeling on the shots while maintaining durability at normal and low temperatures.

DESCRIPTION OF THE RELATED ART

So far, in order to improve a flight distance of golf balls, a method of enlarging a core composed of a rubber composition having a high rebound property with a thinner cover in the golf balls has been known. However, in accordance with the thinner cover, since the volume of the cover layer decrease, the stiffness of the cover layer is lowered. As a result, there is a problem that the spin rate increases on the driver shot.

In order to solve these problems, it has been proposed to use a resin having a high stiffness as a cover composition for forming the cover. For example, Japanese Patent Publication Nos. H6-80718 and H9-10357 disclose a golf ball using a cover composition containing an ionomer resin having a high acid content as a resin component. Japanese Patent Publication No. 3 discloses a golf ball using a cover composition containing a diamine complex of an ionomer resin as a resin component. However, in the case of using the ionomer resin having a high acid content or the diamine complex of the ionomer resin, the durability of the golf ball was lowered. Further, in the case of using the ionomer resin having a high neutralized degree, the moldability of the cover composition was lowered.

Therefore, a technology for a high stiffness has been proposed without using the above ionomer resins having a high acid content or a high neutralized degree. For example, Japanese Patent Publication No. 2001-509204T discloses a use of a compatibilized blend comprising about 4 percent to 95 percent of at least one ionomer resin; about 95 percent to 4 percent of at least one non-ionic polymer; and about 1 to 15 phr, based on 100 parts ionomer resin and non-ionic polymer, of at least one non-carboxylic acid compatibilizer comprising a material selected from the group consisting of functionalized block and graft polymers, oligomers, and mixtures thereof, wherein at least one portion of the non-carboxylic acid compatibilizer is miscible with the at least one ionomer and at least one portion of the non-carboxylic acid compatibilizer is miscible with the at least one non-ionic polymer.

Japanese Patent Publication No. 2001-514561T discloses a use of a composition comprising a substantially compatibilizer-free blend of about 10 wt. % to about 80 wt. % of at least one ionomer and about 90 wt. % to about 20 wt. % of at least one polyamide polymer. Japanese Patent Publication No. H10-314341 discloses a cover material for the golf ball comprising a rubber modified thermoplastic resin composition, which is obtained by mixing a functionalized rubbery copolymer to a base resin comprising an ionomer resin, a non-ionomer thermoplastic elastomer, or a mixture thereof.

Japanese Patent Publication No. 2007-622 A discloses a golf ball material that essentially contains the following components (I) to (III): (I) an ionomer, (II) a resin composition including one or more types selected from a group consisting of diene-based polymers, thermoplastic polymers, and thermosetting polymers; and (III) an acid group-containing thermoplastic resin composition.

SUMMARY OF THE INVENTION

An effort has been made to use the cover material having a high stiffness in order to solve a problem that the stiffness of the cover layer decreases in accordance with the thinner cover. However, the durability and the repulsion are insufficient for the golf ball having the thin cover structure. Thus, further improvement is necessary for the practical application.

The present invention has been made in view of the above circumstances, and the object of the invention is to provide a golf ball excellent in the durability at the normal and low temperatures, flight distance, and shot feeling on the shots. Another object of the present invention is to provide a golf ball excellent in a direction stability on the shots.

The present invention, which has solved the above problem, provides a golf ball comprising:

a core consisting of at least one layer; and a cover covering the core and having a thickness ranging from 0.3 mm to 1.0 mm, wherein the cover is formed from a cover composition that contains as a resin component (A) a highly elastic polyamide resin having a flexural modulus in a range from 700 MPa to 5,000 MPa;

(B) a metal-neutralized product of ethylene-(meth)acrylic acid binary copolymer and/or a metal-neutralized product of ethylene-(meth)acrylic acid-(meth)acrylic acid ester ternary copolymer in an amount ratio ((A)/(B)) of (A) the highly elastic polyamide resin to (B) the metal-neutralized product of the binary copolymer and/or the ternary copolymer being (5 mass % to 80 mass %)/(95 mass % to 20 mass %) (the total is 100 mass %); and (C) a resin having a polar functional group in an amount of 0.1 part by mass to 20 parts by mass with respect to 100 parts by mass of a sum of (A) the highly elastic polyamide resin and (B) the metal-neutralized product of the binary copolymer and/or the ternary copolymer, and wherein the cover composition has a slab hardness ranging from 65 to 75 in Shore D hardness.

The present invention also provides a golf ball comprising:

a core consisting of a center having a diameter of 35 mm or less and a surrounding layer covering the center;

at least one intermediate layer covering the core; and a cover covering the intermediate layer and having a thickness ranging from 0.3 mm to 1.0 mm, wherein the cover is formed from a cover composition that contains as a resin component (A) a highly elastic polyamide resin having a flexural modulus in a range from 700 MPa to 5,000 MPa;

(B) a metal-neutralized product of ethylene-(meth)acrylic acid binary copolymer and/or a metal-neutralized product of ethylene-(meth)acrylic acid-(meth)acrylic acid ester ternary copolymer in an amount ratio ((A)/(B)) of (A) the highly elastic polyamide resin to (B) the metal-neutralized product of the binary copolymer and/or the ternary copolymer being (5 mass % to 80 mass %)/(95 mass % to 20 mass %) (the total is 100 mass %); and (C) a resin having a polar functional group in an amount of 0.1 part by mass to 20 parts by mass with respect to 100 parts by mass of a sum of (A) the highly elastic polyamide resin and (B) the metal-neutralized product of the binary copolymer and/or the ternary copolymer, and wherein the cover composition has a slab hardness ranging from 65 to 75 in Shore D hardness and a hardness difference (H3−H1) between a surface hardness (H3) of the core and a center hardness (H1) of the core is 10 or more in Shore D hardness.

Namely, the cover composition of the present invention contains (A) the highly elastic polyamide resin having a high flexural modulus, (B) the metal-neutralized product of the binary copolymer and/or the ternary copolymer having a high repulsion and high fluidity, and (C) the resin having a polar functional group in a specific amount. The component (A) enhances the resilience of the cover composition and further improves the low temperature durability. The component (B) improves the repulsion and the fluidity of the cover composition. The component (C) improves the interface strength between the component (A) and the component (B) without sacrificing the fluidity of the cover composition. As a result, if the cover layer is formed from the above cover composition, the cover layer with the high elasticity and the improved low temperature durability is provided. In the present invention, use of the above cover composition allows the golf ball to have a thinner cover, a core having an outer hard-inner soft structure, and a center having a reduced diameter, thereby lowering the spin rate on the driver shots, while maintaining the durability at normal and low temperatures. Accordingly, the flight distance and the direction stability are improved, and the shot feeling is not deteriorated even if the cover has a high hardness.

According to the present invention, a golf ball excellent in the durability at the normal and low temperatures, flight distance and shot feeling on the shots is obtained. Further, according to the present invention, a golf ball excellent in the durability at the normal and low temperatures as well as the flight distance, direction stability and shot feeling on the shots is obtained.

DESCRIPTION OF THE PREFERRED EMBODIMENT

Figure 1:
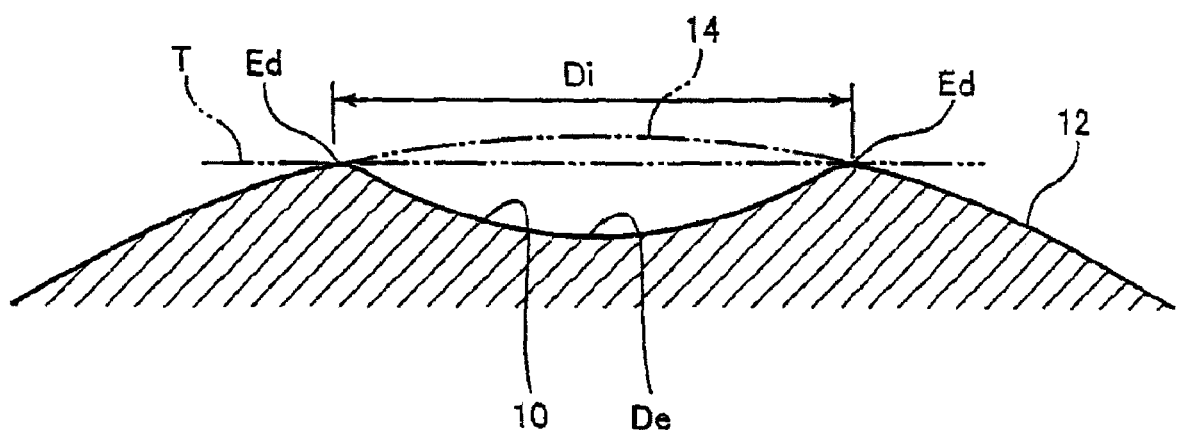
FIG. 1 is an expanded sectional view of the dimples formed on the surface of the golf ball body.

The present invention provides a golf ball comprising:
a core consisting of at least one layer; and
a cover covering the core and having a thickness ranging from 0.3 mm to 1.0 mm,
wherein the cover is formed from a cover composition that contains as a resin component
(A) a highly elastic polyamide resin having a flexural modulus in a range from 700 MPa to 5,000 MPa;
(B) a metal-neutralized product of ethylene-(meth)acrylic acid binary copolymer and/or a metal-neutralized product of ethylene-(meth)acrylic acid-(meth)acrylic acid ester ternary copolymer in an amount ratio ((A)/(B)) of (A) the highly elastic polyamide resin to (B) the metal-neutralized product of the binary copolymer and/or the ternary copolymer being (5 mass % to 80 mass %)/(95 mass % to 20 mass %) (the total is 100 mass %); and
(C) a resin having a polar functional group in an amount of 0.1 part by mass to 20 parts by mass with respect to 100 parts by mass of a sum of (A) the highly elastic polyamide resin and (B) the metal-neutralized product of the binary copolymer and/or the ternary copolymer, and
wherein the cover composition has a slab hardness ranging from 65 to 75 in Shore D hardness.

The present invention also provides a golf ball comprising:
a core consisting of a center having a diameter of 35 mm or less and a surrounding layer covering the center;
at least one intermediate layer covering the core; and
a cover covering the intermediate layer and having a thickness ranging from 0.3 mm to 1.0 mm,
wherein the cover is formed from a cover composition that contains as a resin component
(A) a highly elastic polyamide resin having a flexural modulus in a range from 700 MPa to 5,000 MPa;
(B) a metal-neutralized product of ethylene-(meth)acrylic acid binary copolymer and/or a metal-neutralized product of ethylene-(meth)acrylic acid-(meth)acrylic acid ester ternary copolymer in an amount ratio ((A)/(B)) of (A) the highly elastic polyamide resin to (B) the metal-neutralized product of the binary copolymer and/or the ternary copolymer being (5 mass % to 80 mass %)/(95 mass % to 20 mass %) (the total is 100 mass %); and
(C) a resin having a polar functional group in an amount of 0.1 part by mass to 20 parts by mass with respect to 100 parts by mass of a sum of (A) the highly elastic polyamide resin and (B) the metal-neutralized product of the binary copolymer and/or the ternary copolymer, and
wherein the cover composition has a slab hardness ranging from 65 to 75 in Shore D hardness and a hardness difference (H3−H1) between a surface hardness (H3) of the core and a center hardness (H1) of the core is 10 or more in Shore D hardness.

First, (A) the highly elastic polyamide resin having a flexural modulus in a range from 700 MPa to 5,000 MPa will be described.

(A) The highly elastic polyamide resin is not limited, as long as it is a polyamide resin or a polyamide elastomer comprising a polyamide and having a flexural modulus in a range from 700 MPa to 5,000 MPa. Herein, "polyamide" is defined as a polymer having plurality of amide bonds (—NH—CO—) in a main molecular chain. Use of the highly elastic polyamide resin suppresses the lowering of the repulsion even if the cover thickness is made thin. Further, use of the polyamide resin excellent in the low temperature property improves the low temperature durability of the cover.

Examples of the polyamide contained in (A) the highly elastic polyamide resin are, an aliphatic polyamide such as polyamide 6, polyamide 11, polyamide 12, polyamide 66, polyamide 610, polyamide 6T, polyamide 6I, polyamide 9T, polyamide M5T, polyamide 612; an aromatic polyamide such as poly-p-phenyleneterephthalamide, poly-m-phenyleneisophthalamide; an amide copolymer such as a polyether-block amide copolymer, a polyester amide copolymer, a polyether-ester amide copolymer, a polyamideimide copolymer. These polyamides may be used individually or in combination of at least two of them. Among them, the aliphatic polyamide such as polyamide 6, polyamide 11, polyamide 12 is preferable.

The flexural modulus of (A) the highly elastic polyamide resin is 700 MPa or more, preferably 750 MPa or more, and more preferably 800 MPa or more. If the flexural modulus of (A) the highly elastic polyamide resin is 700 MPa or more, the stiffness of the cover increases, and hence the effect of reducing the spin rate becomes large. Further, the flexural modulus of (A) the highly elastic polyamide resin is 5,000 MPa or less, preferably 4,500 MPa or less, and more preferably 4,000 MPa or less. If the flexural modulus of (A) the highly elastic polyamide resin is 5,000 MPa or less, the stiffness of the cover layer is not excessively enhanced, and hence the shot feeling and the durability become good. In the present invention, the flexural modulus is a value measured according to ISO 178, and the method for measuring the flexural modulus is described later.

The brittle temperature of (A) the highly elastic polyamide resin is preferably −20° C. or less, more preferably −30° C. or less, even more preferably −50° C. or less. If the brittle temperature of (A) the highly elastic polyamide resin is −20° C. or less, the low temperature durability of the cover is further improved, and thus the low temperature durability of the resultant golf ball is further improved. In the present invention, the brittle temperature of (A) the highly elastic polyamide resin is a value measured according to JIS K7216.

Specific examples of (A) the highly elastic polyamide resin include "Novamid (registered trademark) ST220, Novamid 1010C2, Novamid ST145" available from Mitsubishi Engineering-Plastics Company, "Pebax (registered trademark) 4033SA, Pebax 7233SA" available from Arkema Inc., "UBE Nylon (registered trademark) 10181, UBE Nylon 1030J", "UBESTA (registered trademark) P3014U, UBESTA3035JU6, UBESTA PAE1200U2" available from UBE INDUSTRIES, LTD, "Zytel (registered trademark) FN716, Zytel ST811HS" available from E.I. du Pont de Nemours and Company, "Amilan (registered trademark) U441, Amilan U328, Amilan U141" available from Toray Industries Inc., "Leona (registered trademark) 1300S" available from Asahi Kasei Corporation.

The content of (A) the highly elastic polyamide resin in the resin component contained in the cover composition is preferably 8 mass % or more, more preferably 15 mass % or more, and even more preferably 25 mass % or more, and is preferably 75 mass % or less, more preferably 70 mass % or less, and even more preferably 60 mass % or less. If the content of (A) the highly elastic polyamide resin in the resin component contained in the cover composition is 8 mass % or more, the modulus of the cover becomes high, and the effect of the high launch angle and low spin rate on the driver shots becomes large. On the other hand, if the content of (A) the highly elastic polyamide resin in the resin component contained in the cover composition is 75 mass % or less, the modulus of the cover is not excessively increased. Thus, the durability and shot feeling of the resultant golf ball become good.

Next, (B) the metal-neutralized product of the ethylene-(meth)acrylic acid binary copolymer and/or the metal-neutralized product of the ethylene-(meth)acrylic acid-(meth) acrylic acid ester ternary copolymer (hereinafter, simply referred to as "(B) metal-neutralized copolymer") will be described. Herein, "(meth)acrylic acid" means acrylic acid and/or methacrylic acid.

(B) The metal-neutralized copolymer is a metal-ion neutralized product of a binary copolymer obtained by copolymerizing a monomer composition containing ethylene and (meth)acrylic acid and neutralizing at least a part of carboxyl groups in the binary copolymer with a metal ion and/or a metal-ion neutralized product of a ternary copolymer obtained by copolymerizing a monomer composition containing ethylene, (meth)acrylic acid and (meth)acrylic acid ester and neutralizing at least a part of carboxyl groups in the ternary copolymer with a metal ion.

Examples of the (meth)acrylic acid ester are as methyl (meth)acrylate, ethyl (meth)acrylate, isopropyl (meth)acrylate, isobutyl (meth)acrylate, n-butyl (meth)acrylate, isooctyl (meth)acrylate, and 2-ethylhexyl (meth)acrylate.

The content of the (meth)acrylic acid component in the copolymer constituting (B) the metal-ion neutralized copolymer is preferably 2 mass % or more, more preferably 3 mass % or more, and is preferably 30 mass % or less, more preferably 25 mass % or less.

The copolymer constituting (B) the metal-neutralized copolymer may be a multi-component copolymer obtained by copolymerizing another monomer than ethylene, (meth) acrylic acid and (meth)acrylic acid ester. Examples of another monomer which can be used for the multi-component copolymer are a vinyl ester such as vinyl acetate, vinyl propionate; an unsaturated carboxylic acid ester such as dimethyl maleate, diethyl maleate, carbon monoxide, and sulfur dioxide.

In the case that another monomer is used, the content of another monomer in the copolymer is preferably 40 mass % or less, more preferably 30 mass % or less, even more preferably 20 mass % or less.

Examples of a metal (ion) used for neutralization for (B) the metal neutralized copolymer include: monovalent metals (ions), such as sodium, potassium, lithium, and the like; divalent metals (ions), such as magnesium, calcium, zinc, barium, cadmium, and the like; trivalent metals (ions), such as aluminum and the like; and other metals (ions), such as tin, zirconium, and the like. Among these metals (ions), sodium, zinc and magnesium (ions) are preferably used because they provide excellent resilience, durability, or the like.

The degree of neutralization of the acidic groups contained in (B) the metal neutralized copolymer is preferably 20 mole % or more, more preferably 30 mole % or more, and is preferably 90 mole % or less, more preferably 85 mole % or less. The degree of neutralization of the acidic groups in (B) the metal neutralized copolymer can be calculated by using the following mathematical expression 1.

Degree of neutralization (mol %)=(the number of moles of acidic groups neutralized in a metal neutralized copolymer/the number of moles of all acidic groups contained in the metal neutralized copolymer)×100    [Mathematical Expression 1]

The flexural modulus of (B) the metal neutralized copolymer is 250 MPa or more, preferably 260 MPa or more, and more preferably 270 MPa or more, and is 1,000 MPa or less, preferably 800 MPa or less, and more preferably 600 MPa or less. If the flexural modulus of (B) the metal neutralized copolymer is 250 MPa or more, the elastic modulus of the cover becomes high, and the effects of increasing the launch angle and reducing the spin rate become large. On the other hand, if the flexural modulus of (B) the metal neutralized copolymer is 1000 MPa or less, the elastic modulus of the cover does not become excessively high, and the durability and the shot feeling of the golf ball become better.

Specific examples of the ionomer resin (B) include trade name "Himilan (registered trademark) (e.g. Himilan 1555 (Na), Himilan 1557 (Zn), Himilan 1605 (Na), Himilan 1706 (Zn), Himilan 1707 (Na), Himilan AM7311 (Mg), Himilan AM7317, Himilan AM 7318, Himilan AM7329 (Zn), Himilan 1856 (Na), Himilan 1855 (Zn), Himilan MK7320 and the like)" commercially available from Du Pont-Mitsui Polychemicals Co., Ltd.

Further, ionomer resins commercially available from E.I. du Pont de Nemours and Company include trade name "Surlyn (registered trademark) (e.g. Surlyn 8945 (Na), Surlyn 9945 (Zn), Surlyn 8140 (Na), Surlyn 8150 (Na), Surlyn 9120 (Zn), Surlyn 9150 (Zn), Surlyn 6910 (Mg), Surlyn 6120 (Mg), Surlyn 7930 (Li), Surlyn 7940 (Li), Surlyn AD8546 (Li), Surlyn 6320 (Mg), Surlyn 8120 (Na), Surlyn 8320 (Na), Surlyn 9320 (Zn), Surlyn 9320W (Zn), Surlyn 8940 (Na), Surlyn 9910 (Zn) and the like)", "HPF 1000 (Mg), HPF 2000 (Mg)", and the like.

Further, ionomer resins commercially available from ExxonMobil Chemical Corporation include trade name "Iotek (registered trademark) (e.g. Iotek 8000 (Na), Iotek 8030 (Na), Iotek 7010 (Zn), Iotek 7030 (Zn), and the like)". Examples of a ternary copolymerized ionomer are "Iotek 7510 (Zn), Iotek 7520 (Zn)" and the like.

It is noted that Na, Zn, Li, and Mg described in the parentheses after the trade names indicate metal types of neutralizing metal ions for the metal neutralized copolymer.

The content of (B) the metal neutralized copolymer in the resin component constituting the cover composition is preferably 25 mass % or more, more preferably 35 mass % or more, even more preferably 40 mass % or more, and is preferably 92 mass % or less, more preferably 85 mass % or less, and even more preferably 75 mass % or less. If the content of (B) the metal neutralized copolymer in the resin component constituting the cover composition is 25 mass % or more, the repulsive performance and the durability of the golf ball becomes better. On the other hand, if the content is 92 mass % or less, the elastic modulus of the cover can be made in an appropriate range, and hence the effects of increasing the launch angle and reducing the spin rate become lager.

Next, (C) a resin having a polar functional group will be explained.

(C) The resin having a polar functional group is not limited, as long as it is a polymer into which a polar functional group is incorporated, for example, a resin obtained by copolymerizing a monomer having a polar functional group and a monomer not having a polar functional group. Herein, the polar functional group is a functional group having a polarity and becomes a factor that allows a resin to bear polarity, and examples include an epoxy group, a hydroxyl group, an amino group, a nitro group, a carboxyl group, a formyl group, a nitrile group, a sulfonic acid group, and the like. Among them, the epoxy group, and the carboxyl group are preferable.

Because the main backbone of (C) the resin having a functional group has a low polarity, the main backbone is highly compatible with (A) the highly elastic polyamide resin. Because the polar functional group introduced in (C) the resin has a high polarity, the polar functional group (side chain portion) is highly compatible with (B) the metal neutralized copolymer. Thus, by causing the cover composition to contain (C) the resin having a polar functional group, the dispersibility between (A) the highly elastic polyamide resin and (B) the metal neutralized copolymer can be improved, and hence the durability at the normal and low temperatures of the golf ball can be further improved.

Examples of the monomer having a polar functional group include, but are not limited to, epoxy group-containing monomers such as glycidyl (meth)acrylate, 2-vinyloxirane, (allyloxy)oxirane, and the like; hydroxyl group-containing monomers such as 2-hydroxyethyl (meth)acrylate, 2-hydroxypropyl (meth)acrylate, vinyl alcohol, allyl alcohol, 2-hydroxyethyl vinyl ether, and the like; sulfonic group-containing monomers such as vinyl sulfonic acid and the like; and carboxyl group-containing monomers such as (meth)acrylic acid, itaconic acid, maleic anhydride, and the like. These monomers having polar functional groups may be used solely or in combination of two or more thereof. Among them, as the monomer having a polar functional group, epoxy group-containing monomers are preferable, and in particular, glycidyl (meth)acrylate is more preferable. An epoxy group can further improve the interface strength between (A) the highly elastic polyamide resin and (B) the metal neutralized copolymer because it has reactivity with the carboxyl group contained in (B) the metal neutralized copolymer.

Examples of the monomer not having a polar functional group include, but are not limited to, olefins such as ethylene, propylene, 1-butene, isobutene, 1-pentene, and the like; and alkyl (meth)acrylates such as methyl (meth)acrylate, ethyl (meth)acrylate, propyl (meth)acrylate, n-butyl (meth)acrylate, isobutyl (meth)acrylate, and the like. These monomers not having polar functional groups may be used solely or in combination of two or more types thereof. Among them, as the monomer not having a polar functional group, ethylene and methyl (meth)acrylate are preferable.

The content of the monomer component having a polar functional group contained in (C) the resin having a polar functional group is preferably 0.1 mass % or more, more preferably 0.5 mass % or more, and even more preferably 1 mass % or more, and is preferably 30 mass % or less, more preferably 25 mass % or less, even more preferably 20 mass % or less. By causing the content of the monomer component having a polar functional group in (C) the resin having a polar functional group to be in the above range, the dispersibility between (A) the highly elastic polyamide resin and (B) the metal neutralized copolymer can be sufficiently enhanced.

Examples of (C) the resin having a polar functional group include a (meth)acrylic acid ester-glycidyl (meth)acrylate copolymer, an epoxy group-containing (meth)acrylic-based polymer, an ethylene-glycidyl (meth)acrylate copolymer, an ethylene-(meth)acrylic acid copolymer, an ethylene-(meth)acrylic acid-(meth)acrylic acid ester copolymer, an ethylene-(meth)acrylic acid ester-glycidyl (meth)acrylate copolymer, a maleic acid modified styrene-ethylene-butylene-styrene block polymer (SEBS), a maleic acid modified styrene-ethylene-butylene-olefin crystalline block polymer (SEBC), a maleic acid modified polyethylene (PE), a maleic acid modified polypropylene (PP), a maleic acid modified ethylene-vinyl acetate copolymer (EVA), a maleic acid modified ethylene-propylene-diene rubber (EPDM), an epoxy group-containing styrene-based polymer, and the like. These resins (C) having polar functional groups may be used solely or in combination of two or more types thereof. Among them, an ethylene-glycidyl (meth)acrylate copolymer, an ethylene-(meth)acrylic acid ester-glycidyl (meth)acrylate copolymer, and a methyl methacrylate-glycidyl methacrylate copolymer are preferable, and in particular, an ethylene-glycidyl methacrylate copolymer and the mixture of an ethylene-glycidyl methacrylate copolymer and another resin (C) having a polar functional group are preferable.

Specific examples of (C) the resin having a polar functional group include "LOTARDER AX8840" manufactured by Arkema Inc., "ARUFON (registered trademark) UG-4030" manufactured by Toagosei Co., Ltd., "Bond Fast (registered trademark) E" manufactured by Sumitomo Chemical Co., Ltd., "Tuftec (registered trademark) M1913 and Tuftec M1943" manufactured by Asahi Kasei Corporation, "FUSABOND (registered trademark) NM052D" manufactured by E.I. du Pont de Nemours and Company, "Dynaron (registered trademark) 4630P" manufactured by JSR Corporation, "NUCREL (registered trademark) (e.g. NUCREL AN4214C, NUCREL AN4225C, NUCREL AN42115C, NUCREL N0903HC, NUCREL N0908C, NUCREL AN42012C, NUCREL N410, NUCREL N1035, NUCREL N1050H, NUCREL N1108C, NUCREL N1110H, NUCREL N1207C, NUCREL N1214, NUCREL AN4221C, NUCREL N1525, NUCREL N1560, NUCREL N0200H, NUCREL AN4228C, NUCREL N4213C, NUCREL N035C, and the like) manufactured by Du Pont-Mitsui Polychemicals Co., Ltd., and the like.

The content ratio ((A)/(B)) of (A) the highly elastic polyamide resin to (B) the metal neutralized copolymer (the total is 100 mass %) in the cover composition is preferably (5 mass % to 80 mass %)/(95 mass % to 20 mass %). By causing the content ratio of (A) the highly elastic polyamide resin to (B) the metal neutralized copolymer to be in the above range, the cover has a desired elastic modulus, and the launch angle is increased and the spin rate is reduced on the driver shots, thereby improving the flight distance of the golf ball. The content ratio ((A)/(B)) of (A) the highly elastic polyamide resin to (B) the metal neutralized copolymer (the total is 100 mass %) in the cover composition is more preferably (10 mass % to 75 mass %)/(90 mass % to 25 mass %) and even more preferably (30 mass % to 70 mass %)/(70 mass % to 30 mass %).

The cover composition preferably contains (C) the resin having a polar functional group in an amount of 20 parts by mass or less with respect to 100 parts by mass of the sum of (A) the highly elastic polyamide resin and (B) the metal neutralized copolymer. If the content of (C) the resin having a polar functional group is 20 parts by mass or less, the fluidity of the cover composition may not be lowered too much and the moldability becomes good. The content of (C) the resin having a polar functional group is preferably 15 parts or less, more preferably 10 parts or less by mass. On the other hand, the cover composition preferably contains (C) the resin having a polar functional group in an amount of 0.1 part by mass or more with respect to 100 parts by mass of the sum of (A) the highly elastic polyamide resin and (B) the metal neutralized copolymer. If the content of (C) the resin having a polar functional group is 0.1 part by mass or more, the improved effect of the mutual dispersibility between (A) the highly elastic polyamide resin and (B) the metal neutralized copolymer becomes large. The content of (C) the resin having a polar functional group is preferably 2 parts by mass or more.

The cover composition may contain another resin component in addition to (A) the highly elastic polyamide resin, (B) the metal neutralized copolymer, and (C) the resin having a polar functional group, as long as another resin component does not impair the effects of the present invention. However, it is preferred that the resin component in the cover composition consists of (A) the highly elastic polyamide resin, (B) the metal neutralized copolymer, and (C) the resin having a polar functional group.

In the present invention, in addition to the aforementioned resin component, the cover composition may contain a pigment component such as a white pigment (for example, titanium oxide), a blue pigment (for example, ultra marine blue), a red pigment, and the like, a specific gravity adjusting agent such as zinc oxide, calcium carbonate, barium sulfate, and the like, a dispersant, an antioxidant, an ultraviolet absorber, a light stabilizer, a fluorescent material or a fluorescent brightener and the like, as long as they do not impair the performance of the cover.

The amount of the white pigment (titanium oxide), with respect to 100 parts by mass of the resin component constituting the cover, is preferably 0.5 part by mass or more and more preferably 1 part by mass or more, and is preferably 10 parts by mass or less and more preferably 8 parts by mass or less. By causing the amount of the white pigment to be 0.5 parts by mass or more, it is possible to provide opacity to the cover. If the amount of the white pigment is more than 10 parts by mass, there is the possibility that the durability of the resultant cover will deteriorate.

In a process for producing the golf ball of the present invention, (A) the highly elastic polyamide resin, (B) the metal neutralized copolymer, and (C) the resin having a polar functional group are blended, and an additive is blended therewith according to need, to obtain a cover composition. For this blending of the cover composition, for example, it is preferable to use a mixer capable of blending pellet materials, and it is more preferable to use a tumbler mixer. Embodiments for blending the cover composition include an embodiment in which (A) the highly elastic polyamide resin, (B) the metal neutralized copolymer, (C) the resin having a polar functional group, and an additive such as titanium oxide or the like are blended and extruded to prepare a pellet; and an embodiment in which an additive such as titanium oxide or the like is blended with (B) the metal neutralized copolymer and extruded to prepare a white pellet in advance, then the white pellet and the respective pellets of (A) the highly elastic polyamide resin and the resin (C) having a polar functional group are dry-blended.

The slab hardness H5 in Shore D hardness of the cover composition is preferably 65 or more, more preferably 66 or more, and even more preferably 67 or more, and is preferably 75 or less, more preferably 73 or less, and even more preferably 70 or less. If the slab hardness H5 in Shore D hardness of the cover composition is 65 or more, the hardness of the resultant cover does not become excessively low, and hence the effects of increasing the launch angle and reducing the spin rate on the driver shots become larger. Further, if the slab hardness H5 in Shore D hardness of the cover composition is 75 or less, the cover does not become excessively hard, and hence the shot feeling of the golf ball becomes better.

The flexural modulus of the cover composition is preferably 300 MPa or more, more preferably 320 MPa or more, and even more preferably 350 MPa or more, and is preferably 1,000 MPa or less, more preferably 900 MPa or less, and even more preferably 800 MPa or less. If the flexural modulus of the cover composition is 300 MPa or more, the effects of increasing the launch angle and reducing the spin rate on the driver shots become larger, while if the flexural modulus of the cover composition is 1,000 MPa or less, the shot feeling of the golf ball becomes better.

The tensile modulus of the cover composition is preferably 400 MPa or more, more preferably 410 MPa or more, and even more preferably 420 MPa or more, and is preferably 1,500 MPa or less, more preferably 1,400 MPa or less, and even more preferably 1,300 MPa or less. If the tensile modulus of the cover composition is 400 MPa or more, the effects of high launch angle and low spin rate on the diver shots become larger. On the other hand, if the tensile modulus of the cover composition is 1,500 MPa or less, the durability of the golf ball becomes better.

Herein, the slab hardness, the flexural modulus, and the tensile modulus of the cover composition are measured by later-described measuring methods. It is noted that the slab hardness, the flexural modulus, and the tensile modulus of the cover composition can be adjusted, for example, by appropriately deciding the combination of (A) the highly elastic polyamide resin, (B) the metal neutralized copolymer, and (C) the resin having a polar functional group, and appropriately deciding the amount of an additive or the like.

An embodiment for molding a cover is not particularly limited, and includes an embodiment which comprises injection molding the cover composition directly onto the core, or an embodiment which comprises molding the cover composition into a hollow-shell, covering the core with a plurality of the hollow-shells and subjecting the core with a plurality of the hollow shells to the compression-molding (preferably an embodiment which comprises molding the cover composition into a half hollow-shell, covering the core with the two half hollow-shells, and subjecting the core with the two half hollow-shells to the compression-molding). In the case of directly injection molding the cover composition onto the core, it is preferred to use upper and lower molds for forming a cover having a spherical cavity and pimples, wherein a part of the pimple also serves as a retractable hold pin. When forming the cover by injection molding, the hold pin is protruded to hold the core, and the cover composition which has been heated and melted is charged and then cooled to obtain a cover. For example, the cover composition heated and melted at the temperature of 150° C. to 230° C. is charged into a mold held under the pressure of 980 KPa to 1,500 KPa for 0.1 to 1 second. After cooling for 15 to 60 seconds, the mold is opened and the golf ball with the cover molded is taken out from the mold.

When molding the cover in a compression molding method, molding of the half shell can be performed by either compression molding method or injection molding method, and the compression molding method is preferred. The compression-molding of the cover composition into half shell can be carried out, for example, under a pressure of 1 MPa or more and 20 MPa or less at a temperature of −20° C. or more and 70° C. or less relative to the flow beginning temperature of the cover composition. By performing the molding under the above conditions, a half shell having a uniform thickness can be formed. Examples of a method for molding the cover using half shells include compression molding by covering the core with two half shells. The compression molding of half shells into the cover can be carried out, for example, under a pressure of 0.5 MPa or more and 25 MPa or less at a temperature of −20° C. or more and 70° C. or less relative to the flow beginning temperature of the cover composition. By performing the molding under the above conditions, a cover for a golf ball having a uniform thickness can be formed.

The molding temperature means the highest temperature where the temperature at the surface of the concave portion of the lower mold reaches from closing through opening the molds. Further, the flow beginning temperature of the cover material can be measured in a pellet form with the following conditions by using a flow characteristics evaluation apparatus (Flow Tester CFT-500D, manufactured by Shimadzu Corporation).

Measuring conditions: Area size of a plunger: 1 cm$^2$, Die length: 1 mm, Die diameter: 1 mm, Load: 588.399 N, Start temperature: 30° C., and Temperature increase rate: 3° C./min.

When molding a cover, the concave portions called "dimple" are usually formed on the surface. FIG. 1 is an expanded sectional view of a part of a golf ball 2. This figure shows a cross-section which includes the deepest part De of a dimple 10 and the center of the golf ball 2. The up and down direction in FIG. 1 is the depth direction of the dimple 10. The depth direction is the direction from the gravity center of the area of the dimple 10 to the center of the golf ball 2. A chain double-dashed line 14 in FIG. 1 shows a virtual sphere. The surface of the virtual sphere 14 is the surface of the golf ball 2 in the case of assuming that there is no dimple 10. The dimple 10 is depressed in the virtual sphere 14. A land 12 corresponds to the virtual sphere 14. In FIG. 1, the distance between the tangent line T and the deepest point De is the depth of the dimple 10.

Two headed arrow Di in FIG. 1 shows the diameter of the dimple 10. The diameter Di is the distance from one contact point Ed to another contact point Ed when a common tangent line T is drawn in both sides of the dimple 10. The contact points Ed are edges of the dimple 10. The edges Ed define the outline of the dimple 10. The diameter Di is preferably 2.0 mm or more and 6.0 mm or less. If the diameter Di is less than the above range, the dimple effect is hardly obtained and if the diameter Di exceeds 6.0 mm, the intrinsic property of the golf ball 2, that is, it is substantially spherical, is lost. The volume of the dimple means the volume of the portion surrounded with the curved plane including the outline of the dimple 10 and the virtual sphere 14. The total volume of the dimples 10 is preferably 250 mm$^3$ or more and 400 mm$^3$ or less. If the total volume is less than 250 mm$^3$, a hopping trajectory may be provided in some cases. If the total volume exceeds 400 mm$^3$, a dropping trajectory may possibly be provided.

In FIG. 1, the distance between the tangent line T and the deepest point De is the depth of the dimple 10. The depth is preferably 0.05 mm or more and 0.60 mm or less. If the depth is less than 0.05 mm, a hopping trajectory may be provided in some cases. On the other hand, if the depth exceeds 0.60 mm, a dropping trajectory may possibly be provided.

The total number of the dimples 10 formed on the cover is preferably 200 or more and 500 or less. If the total number is less than 200, the dimple effect is hardly obtained. On the other hand, if the total number exceeds 500, the dimple effect is hardly obtained because the size of the respective dimples 10 is small. The shape (shape in a plan view) of dimples 10 includes, for example, without limitation, a circle, polygonal shapes such as roughly triangular shape, roughly quadrangular shape, roughly pentagonal shape, and roughly hexagonal shape, another irregular shape. The shape of the dimples is employed solely or in combination at least two of them.

After the cover is molded, the mold is opened and the golf ball body is taken out from the mold, and as necessary, the golf ball body is preferably subjected to surface treatments such as deburring, cleaning, and sandblast. If desired, a paint film or a mark may be formed. The paint film preferably has a thickness of, but not limited to, 5 μm or larger, and more preferably 7 μm or larger, and preferably has a thickness of 25 μm or smaller, and more preferably 18 μm or smaller. This is because if the thickness is smaller than 5 μm, the paint film is easy to wear off due to continued use of the golf ball, and if the thickness is larger than 25 μm, the effect of the dimples is reduced, resulting in deteriorating flying performance of the golf ball.

In the present invention, the thickness of the cover of the golf ball is preferably 0.3 mm or more, more preferably 0.4 mm or more, even more preferably 0.5 mm or more, and is preferably 1.0 mm or less, more preferably 0.9 mm or less, even more preferably 0.8 mm or less. If the cover has a thickness of 0.3 mm or more, it is easy to mold the cover and the workability is improved. On the other hand, if the cover has a thickness of 1.0 mm or less, since the intermediate layer having the high specific gravity can be disposed in the relatively outer part of the golf ball, the effect of the low spin on the driver shot becomes larger due to the outer heavy inner light structure. Herein, the thickness is measured at the portion where the dimples are not formed, that is the thickness under the land 12 (refer to FIG. 1), and the thicknesses measured at least 4 portions are averaged.

The golf ball of the present invention is not limited, as long as it comprises a core consisting of at least one layer, and a cover. The present invention also includes a golf ball comprising a core consisting of at least one layer, an intermediate layer, and a cover.

Specific examples of the golf ball of the present invention include a two-piece golf ball comprising a single-layered core and a cover covering the core; a three-piece golf ball comprising a core consisting of a center and a surrounding layer covering the center, and a cover covering the core; a three-piece golf ball comprising a single-layered core, an intermediate layer covering the core, and a cover covering the intermediate layer; a multi-piece golf ball comprising a core consisting of a center and a surrounding layer covering the center, at least one intermediate layer covering the core, and a cover covering the intermediate layer; and a multi-piece golf ball comprising a core consisting of a center and at least one surrounding layer covering the center, an intermediate layer covering the core and a cover covering the intermediate layer. Among them, the present invention is suitably applicable to a three-piece golf ball comprising a single-layered core and an intermediate layer covering the core, and a cover covering the intermediate layer, and a four-piece golf ball comprising a core consisting of a center and a surrounding layer covering the center, an intermediate layer covering the core and a cover covering the intermediate layer.

In a preferable embodiment, the golf ball comprises
a core consisting of a center having a diameter of 35 mm or less and a surrounding layer covering the center;
at least one intermediate layer covering the core; and
a cover covering the intermediate layer and having a thickness ranging from 0.3 mm to 1.0 mm,
wherein the cover composition has a slab hardness ranging from 65 to 75 in Shore D hardness and a hardness difference (H3−H1) between a surface hardness (H3) of the core and a center hardness (H1) of the core is 10 or more in Shore D hardness.

Next, the core used in the present invention will be described.

The core used in the present invention is not limited, as long as the core consists of at least one layer and includes, for example, a single-layered core, a core consisting of a center and at least one surrounding layer covering the center.

The core preferably has a spherical shape. If the core does not have a spherical shape, the cover and/or the intermediate layer does not have a uniform thickness. As a result, there exist some portions where the performance of the cover and/or the intermediate layer is lowered. On the other hand, the center generally has the spherical shape, but the center may be provided with a rib on the surface thereof so that the surface of the spherical center is divided by the ribs. For example, the surface of the spherical center is evenly divided by the ribs. In one embodiment, the ribs are preferably formed on the surface of the spherical center in an integrated manner, and in another embodiment, the ribs are formed as a surrounding layer on the surface of the spherical center.

The ribs are preferably formed along an equatorial line and meridians that evenly divide the surface of the spherical center, if the spherical center is assumed as the earth. For example, if the surface of the spherical center is evenly divided into 8, the ribs are formed along the equatorial line, any meridian as a standard, and meridians at the longitude 90 degrees east, longitude 90 degrees west, and the longitude 180 degrees east(west), assuming that the meridian as the standard is at longitude 0 degree. If the ribs are formed, the depressed portion divided by the ribs are preferably filled with a plurality of surrounding layers or with a single-layered surrounding layer that fills each of the depressed portions to make a core in the spherical shape. The shape of the ribs, without limitation, includes an arc or an almost arc (for example, a part of the arc is removed to obtain a flat surface at the cross or orthogonal portions thereof).

Next, the single-layered core body, or the center in the core consisting of a center and at least one surrounding layer covering the center will be explained.

As the center or the single-layered core of the golf ball of the present invention, a conventionally known rubber composition (hereinafter simply referred to as "core rubber composition" occasionally) may be employed, and they can be molded by, for example, heat-pressing a rubber composition containing a base rubber, a crosslinking initiator, a co-crosslinking agent, and a filler.

As the base rubber, a natural rubber and/or a synthetic rubber may be used. Examples of the base rubber are a polybutadiene rubber, a natural rubber, a polyisoprene rubber, a styrene polybutadiene rubber, and ethylene-propylene-diene terpolymer (EPDM). Among them, typically preferred is the high cis-polybutadiene having cis-1,4-bond in a proportion of 40% or more, more preferably 70% or more, even more preferably 90% or more in view of its superior repulsion property.

The crosslinking initiator is blended to crosslink the base rubber component. As the crosslinking initiator, an organic peroxide is preferably used. Examples of the organic peroxide for use in the present invention are dicumyl peroxide, 1,1-bis(t-butylperoxy)-3,5-trimethylcyclohexane, 2,5-dimethyl-2,5-di(t-butylperoxy)hexane, and di-t-butyl peroxide. Among them, dicumyl peroxide is preferable. An amount of the crosslinking initiator to be blended in the rubber composition is preferably 0.3 part by mass or more, more preferably 0.4 part by mass or more, and is preferably 5 parts by mass or less, more preferably 3 parts by mass or less based on 100 parts by mass of the base rubber. If the amount is less than 0.3 part by mass, the core becomes too soft, and the repulsion tends to be lowered, and if the amount is more than 5 parts by mass, the amount of the co-crosslinking agent must be increased in order to obtain the appropriate hardness, which tends to cause the insufficient repulsion.

The co-crosslinking agent is not particularly limited as long as it serves to crosslink a rubber molecule by graft polymerization with a base rubber molecular chain; for example, $\alpha,\beta$-unsaturated carboxylic acid having 3 to 8 carbon atoms or a metal salt thereof, more preferably acrylic acid, methacrylic acid or a metal salt thereof may be used. As the metal constituting the metal salt, for example, zinc, magnesium, calcium, aluminum and sodium may be used, and among them, zinc is preferred because it provides high repulsion.

The amount of the co-crosslinking agent to be used is preferably 10 parts or more, more preferably 15 parts or more, even more preferably 20 parts or more, and is preferably 55 parts or less, more preferably 50 parts or less, even more preferably 48 parts or less based on 100 parts of the base rubber by mass. If the amount of the co-crosslinking agent to be used is less than 10 parts by mass, the amount of the crosslinking initiator must be increased to obtain an appropriate hardness, which tends to lower the repulsion. On the other hand, if the amount of the co-crosslinking agent to be used is more than 55 parts by mass, the core becomes too hard, so that the shot feeling may be lowered.

The filler contained in the core rubber composition is mainly blended as a specific gravity adjusting agent in order to adjust the specific gravity of the golf ball obtained as the final product in the range of 1.0 to 1.5, and may be blended as required. Examples of the filler include an inorganic filler such as zinc oxide, barium sulfate, calcium carbonate, magnesium oxide, tungsten powder, and molybdenum powder. The amount of the filler to be blended in the rubber composition is preferably 0.5 part or more, more preferably 1 part or more, and is preferably 30 parts or less, more preferably 20 parts or less based on 100 parts of the base rubber by mass. If the amount of the filler to be blended is less than 0.5 part by mass, it becomes difficult to adjust the weight, while if it is more than 30 parts by mass, the weight ratio of the rubber component becomes small and the repulsion tends to be lowered.

As the core rubber composition, an organic sulfur compound, an antioxidant or a peptizing agent may be blended appropriately in addition to the base rubber, the crosslinking initiator, the co-crosslinking agent and the filler.

As the organic sulfur compound, a diphenyl disulfide or a derivative thereof may be preferably used. Examples of the diphenyl disulfide or the derivative thereof include diphenyl disulfide, a mono-substituted diphenyl disulfide such as bis (4-chlorophenyl) disulfide, bis(3-chlorophenyl) disulfide, bis (4-bromophenyl) disulfide, bis(3-bromophenyl) disulfide, bis (4-fluorophenyl) disulfide, bis(4-iodophenyl) disulfide and bis(4-cyanophenyl) disulfide; a di-substituted diphenyl disulfide such as bis(2,5-dichlorophenyl) disulfide, bis(3,5-dichlorophenyl) disulfide, bis(2,6-dichlorophenyl) disulfide, bis(2, 5-dibromophenyl) disulfide, bis (3,5-dibromophenyl) disulfide, bis(2-chloro-5-bromophenyl) disulfide, and bis(2-cyano-5-bromophenyl) disulfide; a tri-substituted diphenyl disulfide such as bis (2,4,6-trichlorophenyl) disulfide, and bis(2-cyano-4-chloro-6-bromophenyl) disulfide; a tetra-substituted diphenyl disulfide such as bis(2,3,5,6-tetra chlorophenyl) disulfide; a penta-substituted diphenyl disulfide such as bis (2,3,4,5,6-pentachlorophenyl) disulfide and bis(2, 3,4,5,6-pentabromophenyl) disulfide. These diphenyl disulfides or the derivative thereof can enhance repulsion by having some influence on the state of vulcanization of vulcanized rubber. Among them, diphenyl disulfide and bis(pentabromophenyl) disulfide are preferably used since a golf ball having particularly high repulsion can be obtained. The amount of the diphenyl disulfide or the derivative thereof to be blended is preferably 0.1 part by mass or more, more preferably 0.3 part by mass or more, and preferably 5.0 parts by mass or less, more preferably 3.0 parts by mass or less relative to 100 parts by mass of the base rubber.

The amount of the antioxidant to be blended is preferably 0.1 part or more and is preferably 1 part or less based on 100 parts of the base rubber by mass. Further, the amount of the peptizing agent is preferably 0.1 part or more and is preferably 5 parts or less based on 100 parts of the base rubber by mass.

The single-layered core or the center can be obtained by mixing, kneading, and molding the rubber composition in the molds. The conditions for press-molding the core rubber composition should be determined appropriately depending on the rubber composition. The press-molding is preferably carried out for 10 to 60 minutes at the temperature of 130° C. to 200° C. under the pressure of 2.9 MPa to 11.8 MPa. For example, the press-molding is preferably carried out at the temperature from 130° C. to 200° C. for 10 to 60 minutes. Alternatively, the press-molding is preferably carried out in a two-step heating, for example, for 20 to 40 minutes at the temperature of 130° C. to 150° C., and continuously for 5 to 15 minutes at the temperature of 160° C. to 180° C.

Next, the surrounding layer in the core consisting of the center and at least one surrounding layer covering the center will be described.

Examples of the resin component of the surrounding layer composition for forming the surrounding layer include, in addition to the rubber composition described above, an ionomer resin having a trade name "Himilan (registered trademark) (e.g. "Himilan 1605" and "Himilan 1706") available from Du Pont-Mitsui Polychemicals Co., Ltd., an ionomer resin having a trade name "Surlyn (registered trademark) (e.g. "Surlyn 8140" and Surlyn "9120") available from E.I. du Pont de Nemours and Company, a thermoplastic polyamide elastomer having a trade name "Pebax (registered trademark) (e.g. "Pebax 2533")" commercially available from Arkema Inc., a thermoplastic polyester elastomer having a trade name "Hytrel (registered trademark) (e.g. "Hytrel 3548" and "Hytrel 4047")" commercially available from Du Pont-Toray Co., Ltd., a thermoplastic polyurethane elastomer having a trade name "Elastollan (registered trademark) (e.g. "Elastollan XNY97A") available from BASF Japan Ltd, a thermoplastic polystyrene elastomer having a trade name "Rabalon (registered trademark)" commercially available from Mitsubishi Chemical Corporation, and the like. These resins and elastomers may be used solely or in combination of two or more types thereof. Among them, since the relatively low hardness and the high rebound property are required for the surrounding layer, the rubber composition containing the rubber component as a main component is preferably used. Typically preferred is the high cis-polybutadiene having cis-1,4-bond in a proportion of 40% or more, more preferably 70% or more, even more preferably 90% or more in view of its superior repulsion property.

The surrounding layer is formed by, for example, covering the center with the surrounding layer composition. Examples of the method for forming the surrounding layer includes, without any limitation, a method which comprises molding the surrounding layer composition into a hollow-shell, covering the center with a pair of the upper and lower half hollow-shells and subjecting the center to the press-molding under the condition of 170° C. for 20 minutes in the upper and lower molds having spherical cavities.

The structure of the single-layered core will be explained.

In the case of the single-layered core, the diameter of the single-layered core is preferably 39.1 mm or more, more preferably 39.4 mm or more, and even more preferably 39.8 mm or more. If the diameter of the single-layered core is 39.1 mm or more, the single-layered core becomes large and the repulsion becomes better. In the case that the single-layered core has a larger diameter, since the intermediate layer having the high specific gravity can be disposed in the relatively outer part of the golf ball, the effect of the low spin on the driver shot becomes larger due to the outer heavy inner light structure. Thus, the flight distance is improved. The diameter of the single-layered core is preferably 40.7 mm or less, more preferably 40.5 mm or less, and even more preferably 40.1 mm or less. If the diameter of the single-layered core is 40.7 mm or less, the intermediate layer or the cover layer does not become excessively thin, the intermediate layer or the cover layer functions well.

The single-layered core used in the present invention preferably has a hardness difference (H3−H1) between the surface hardness H3 and the center hardness H1 of 7 or more, more preferably 10 or more, even more preferably 13 or more in Shore D hardness. If the single-layered core is designed to have the surface hardness H3 larger than the center hardness H1, the effect of lowering the spin rate becomes larger and thus the flight distance is improved. The hardness difference (H3−H1) is preferably 25 or less, more preferably 20 or less, even more preferably 17 or less. If the hardness difference is too large, the durability may deteriorate. The hardness difference of the single-layered core can be adjusted by appropriately selecting the heating condition of the single-layered core.

The center hardness H1 of the single-layered core is preferably 30 or larger, more preferably 33 or larger, and even more preferably 36 or larger in Shore D hardness. If the center hardness H1 is 30 or larger in Shore D hardness, the single-layered core does not become too soft, resulting in the good repulsion. The center hardness H1 of the single-layered core is preferably 50 or smaller, more preferably 47 or smaller, and even more preferably 43 or smaller in Shore D. If the center hardness H1 is 50 or less in Shore D hardness, the single-layered core does not become too hard, resulting in the good shot feeling. In the present invention, the center hardness of the single-layered core is the hardness measured with the Shore D type spring hardness tester at the central point of a cut plane of the single-layered core which has been cut into two halves.

The surface hardness H3 in Shore D hardness of the single-layered core is preferably 44 or more, more preferably 47 or more, and even more preferably 50 or more. If the surface hardness H3 in Shore D hardness of the single-layered core is 44 or more, the single-layered core does not become excessively soft, resulting in good shot feeling. The surface hardness H3 in Shore D hardness of the single layered core is preferably 60 or less, more preferably 57 or less, and even more preferably 55 or less. If the surface hardness H3 in Shore D hardness of the single-layered core is 60 or less, the single-layered core does not become excessively hard, resulting in good shot feeling.

Next, the structure of the core consisting of the center and at least one surrounding layer covering the center will be explained. In the following explanation of the structure of the core, the core consisting of the center and at least one surrounding layer covering the center is referred to as "multi-piece core" in order to distinguish it from the single-layered core.

The center preferably has a diameter of 35 mm or less. If the center has a diameter of 35 mm or less, since the thickness of the surrounding layer can be ensured, the effect of increasing the launch angle and decreasing the spin rate on the driver shots can be obtained. The center preferably has a diameter of 33 mm or less, more preferably 32 mm or less, and preferably has a diameter of 10 mm or more, more preferably 15 mm or more. If the diameter of the center is 33 mm or less, since the thickness of the surrounding layer can be made thicker, the effect of increasing the launch angle and decreasing the spin rate on the driver shots becomes larger. If the diameter is 10 mm or more, since the hardness difference (H3−H1) between the surface hardness H3 and the center hardness H1 of the multi-piece core can be made large, the effect of suppressing the spin rate on the driver shots becomes larger.

When the center has a diameter in a range from 10 mm to 35 mm, a compression deformation amount of the center (an compression amount of the center in the compression direction thereof) when applying an initial load of 98 N to a final load of 1275 N is preferably 2.5 mm or more, more preferably 2.7 mm or more, even more preferably 3.0 mm or more and is preferably 7.0 mm or less and more preferably 6.5 mm or less, even more preferably 6.0 mm or less. If the compression deformation amount is 2.5 mm or more, the effect of suppressing the spin rate on the driver shots and the shot feeling are enhanced. On the other hand, if the compression deformation amount is 7.0 mm or less, the repulsion becomes better.

The surrounding layer preferably has a thickness of 15 mm or less, more preferably 10 mm or less, even more preferably 5 mm or less, and preferably has a thickness of 2 mm or more, more preferably 2.5 mm or more. If the surrounding layer has a thickness of 15 mm or less, the shot feeling on the driver shots becomes better. On the other hand, if the thickness is 2 mm or more, since the diameter of the center can be made larger, the effect of lowering the spin rate on the driver shots becomes larger.

The diameter of the multi-piece core is preferably 37 mm or more, more preferably 38 mm or more, and even more preferably 38.5 mm or more, and is preferably 41 mm or less, more preferably 40.5 mm or less, and even more preferably 40 mm or less. If the diameter of the multi-piece core falls within the above range, the effect of suppressing the spin rate on the driver shots becomes larger.

When the multi-piece core has a diameter in a range from 38.5 mm to 40 mm, a compression deformation amount of the multi-piece core (an compression amount of the multi-piece core in the compression direction thereof) when applying an initial load of 98 N to a final load of 1275 N is preferably 2.7 mm or more, more preferably 2.9 mm or more, even more preferably 3.2 mm or more and is preferably 4.5 mm or less and more preferably 4.2 mm or less, even more preferably 3.8 mm or less. If the compression deformation amount is 2.7 mm or more, the effect of suppressing the spin rate and the shot feeling on the driver shots are enhanced. On the other hand, if the compression deformation amount is 4.5 mm or less, the repulsion becomes better.

The center hardness H1 of the multi-piece core (the center) is preferably 22 or larger, more preferably 25 or larger, and even more preferably 28 or larger in Shore D hardness. If the center hardness H1 is 22 or larger in Shore D hardness, the multi-piece core does not become too soft, resulting in the good repulsion. The center hardness H1 of the multi-piece core is preferably 42 or smaller, more preferably 40 or smaller, and even more preferably 38 or smaller in Shore D. If the center hardness H1 is 42 or less in Shore D hardness, the multi-piece core does not become too hard, resulting in the good shot feeling. In the present invention, the center hardness of the multi-piece core is the hardness measured with the Shore D type spring hardness tester at the central point of a cut plane of a multi-piece core which has been cut into two halves.

The surface hardness H2 in Shore D hardness of the center is preferably 44 or more, more preferably 46 or more, and even more preferably 48 or more. If the surface hardness H2 in Shore D hardness of the center is 44 or more, the center does not become excessively soft, resulting in good shot feeling. The surface hardness H2 in Shore D hardness of the center is preferably 60 or less, more preferably 58 or less, and even more preferably 56 or less. If the surface hardness H2 in Shore D hardness of the center is 60 or less, the center does not become excessively hard, resulting in good shot feeling.

The surface hardness H3 of the multi-piece core is preferably 55 or larger, more preferably 57 or larger, and even more preferably 59 or larger in Shore D hardness. If the surface hardness H3 is 55 or larger, the multi-piece core does not become too soft, and the good repulsion would be obtained. The surface hardness H3 of the multi-piece core is preferably 65 or smaller, more preferably 64 or smaller, and even more preferably 63 or smaller in shore D hardness. If the surface hardness H3 is 65 or smaller in Shore D hardness, since the hardness difference between the core and the intermediate layer can be made larger, the effect of lowering the spin rate on the driver shots becomes larger.

The multi-piece core of the golf ball of the present invention preferably has a hardness difference (H3−H1) between the surface hardness H3 and the center hardness H1 of 10 or more in Shore D hardness. If the hardness difference (H3−H1) is 10 or more in Shore D hardness, the effect of lowering the spin rate on the driver shot becomes larger. The hardness difference (H3−H1) is preferably 15 or more, more preferably 20 or more in Shore D hardness. The hardness difference (H3−H1) is preferably 35 or less, more preferably 32 or less, even more preferably 30 or less. If the hardness difference is too large, the durability may deteriorate.

In the present invention, the hardness difference (H3−H1) between the surface hardness H3 of the multi-piece core and the center hardness H1 of the multi-piece core can be easily adjusted by the multi-piece structure of the center and the surrounding layer covering the center. The preferable multi-piece core is a two-layered core consisting of the center and the surrounding layer covering the center.

The golf ball of the present invention preferably has an intermediate layer.

The intermediate layer composition for forming the intermediate layer includes, for example, a rubber composition for the center or single-layered core and a resin composition containing a resin component. It is preferable that the content of the resin component in the intermediate layer composition is 50 mass % or more. Examples of the resin component are an ionomer resin having a trade name "Himilan (registered trademark) (e.g. "Himilan 1605", "Himilan 1706" and "Himilan AM7329")" available from Du Pont-Mitsui Polychemicals Co., Ltd., an ionomer resin having a trade name "Surlyn (registered trademark) (e.g. "Surlyn 8140", "Surlyn 9120" and "Surlyn 8945")" available from E.I. du Pont de Nemours and Company, a thermoplastic polyamide elastomer having a trade name "Pebax (registered trademark) (e.g. "Pebax 2533")" commercially available from Arkema Inc., a thermoplastic polyester elastomer having a trade name "Hytrel (registered trademark) (e.g. "Hytrel 3548" and "Hytrel 4047")" commercially available from Du Pont-Toray Co., Ltd., a thermoplastic polyurethane elastomer having a trade name "Elastollan (registered trademark) (e.g. "Elastollan XNY97A") available from BASF Japan Ltd, a thermoplastic polystyrene elastomer having a trade name "Rabalon (registered trademark) (e.g. "Rabalon T3221C")" commercially available from Mitsubishi Chemical Corporation, and the like. These resins and elastomers may be used solely or in combination of two or more types thereof. Among them, in view of the repulsion, the intermediate layer composition preferably comprises a mixture of the ionomer resin and the thermoplastic styrene elastomer as the resin component.

The intermediate layer composition may further contain a specific gravity adjusting agent, an antioxidant, a pigment and the like appropriately.

Examples of the specific gravity adjusting agent are zinc oxide, barium sulfate, calcium carbonate, magnesium oxide, tungsten, molybdenum and the like. The blending amount of the specific gravity adjusting agent is preferably 1 part or more, more preferably 2 parts or more, even more preferably 3 parts or more, and is preferably 50 parts or less, more preferably 47 parts or less, even more preferably 44 parts or less, with respect to 100 parts of the resin component of the intermediate layer composition by mass. If the blending amount of the specific gravity adjusting agent is 1 part or more by mass, it is easy to adjust the density of the intermediate layer composition, while if the blending amount is 50 parts or less by mass, the dispersibility into the resin component becomes good.

The intermediate layer composition preferably has a density of 1.10 $g/cm^3$ or more, more preferably 1.20 $g/cm^3$ or more, even more preferably 1.30 $g/cm^3$ or more. If the density of the intermediate layer composition is 1.10 $g/cm^3$ or more, the inertia moment of the golf ball can be made high. Since the effect of lowering the spin rate on the driver shots becomes larger, the flight distance and the direction stability become better. On the other hand, the upper limit of the density of the intermediate layer composition is preferably, but not limited to, 1.8 $g/cm^3$, more preferably 1.6 $g/cm^3$, even more preferably 1.5 $g/cm^3$. The intermediate layer having a high density is preferably disposed in the outer part of the golf ball as much as possible.

In this case, the core preferably has a density of 1.15 $g/cm^3$ or less, more preferably 1.13 $g/cm^3$ or less, even more preferably 1.10 $g/cm^3$ or less. If the core has the density of 1.15 $g/cm^3$ or less, the inertia moment of the golf ball can be made high. On the other hand, the cover composition preferably has a density of 0.96 $g/cm^3$ or more, more preferably 0.98 $g/cm^3$ or more, even more preferably 1.00 $g/cm^3$ or more. Further, it is noted that the density of the cover composition is preferably as high as possible, but it is not preferable to add a large amount of the high specific gravity filler to the cover composition, because the high specific gravity filler is generally a colored material.

The intermediate layer composition preferably has a slab hardness (H4) of 35 or more, more preferably 40 or more, even more preferably 45 or more, and preferably has a slab hardness of 55 or less, more preferably 53 or less, even more preferably 50 or less in Shore D hardness. If the intermediate layer composition has a slab hardness (H4) of 35 or more, the repulsion of the golf ball is enhanced. On the other hand, if the intermediate layer composition has a slab hardness of 55 or less, the shot feeling of the golf ball is enhanced. Herein, the slab hardness (H4) of the intermediate layer composition is a measured hardness of the intermediate layer composition that is molded into a sheet form by a measuring method described later.

In the case that the golf ball of the present invention comprises the intermediate layer, the surface hardness H3 of the core and the slab hardness H4 of the intermediate layer composition preferably satisfy the relation H3>H4. If the slab hardness H4 of the intermediate layer composition is smaller than the surface hardness H3 of the core, the soft shot feeling is obtained. The hardness difference (H3−H4) between the surface hardness H3 of the core and the slab hardness H4 of the intermediate layer composition is preferably 2 or more, more preferably 5 or more, and is preferably 15 or less, more preferably 10 or less.

The slab hardness H4 of the intermediate layer composition, the center hardness H1 of the core, and the surface hardness H3 of the core preferably satisfy the relation of H1≦H4<H3. Satisfying the relation provides better shot feeling.

The intermediate layer is formed, for example, by covering the core with the intermediate layer composition. An embodiment for molding the intermediate layer is not particularly limited, and includes an embodiment which comprises injection molding the intermediate layer composition directly onto the core, or an embodiment which comprises molding the intermediate layer composition into a half hollow-shell, covering the core with the two hollow-shells and subjecting the core with the two hollow shells to the compression-molding for 1 to 5 minutes at the temperature of 130° C. to 170° C.

The thickness of the intermediate layer is preferably 1.2 mm or less, more preferably 1.0 mm or less, and even more preferably 0.9 mm or less, and is preferably 0.5 mm or more, more preferably 0.6 mm or more. If the thickness of the intermediate layer is 1.2 mm or less, since the core becomes relatively large, the repulsion of the golf ball is enhanced, while if the thickness of the intermediate layer is 0.5 mm or more, since the effect of the intermediate layer having the high specific gravity becomes large, the inertia moment becomes high and the much lower spin is obtained.

The slab hardness and the density of the intermediate layer composition is appropriately adjusted by selecting the combination of the resin components, and controlling the amount of the additives or the like.

Embodiments of the core and the intermediate layer include, for example, an embodiment where the core is covered with the single-layered intermediate layer or an embodiment where the core is covered with multi-piece or multi-layered of the intermediate layers.

The shape after covering the core with the intermediate layer preferably has a spherical shape. If the intermediate layer does not have a spherical shape, the cover does not have a uniform thickness. As a result, there exist some portions where the performance of the cover is lowered. On the other hand, the core generally has the spherical shape, but the core may be provided with a rib on the surface thereof so that the surface of the spherical core is divided by the ribs. For example, the surface of the spherical core is evenly divided by the ribs. In one embodiment, the ribs are preferably formed on the surface of the spherical core in an integrated manner, and in another embodiment, the ribs are formed as an intermediate layer on the surface of the spherical core.

The ribs are preferably formed along an equatorial line and meridians that evenly divide the surface of the spherical core, if the spherical core is assumed as the earth. For example, if the surface of the spherical core is evenly divided into 8, the ribs are formed along the equatorial line, any meridian as a standard, and meridians at the longitude 90 degrees east, longitude 90 degrees west, and the longitude 180 degrees east(west), assuming that the meridian as the standard is at longitude 0 degree. If the ribs are formed, the depressed portion divided by the ribs are preferably filled with a plurality of intermediate layers or with a single-layered intermediate layer that fills each of the depressed portions to obtain the spherical shape. The shape of the ribs, without limitation, includes an arc or an almost arc (for example, a part of the arc is removed to obtain a flat surface at the cross or orthogonal portions thereof).

When preparing a wound golf ball in the present invention, a wound core may be used as the core. In that case, for example, a wound core comprising a center formed by curing the above core rubber composition and a rubber thread layer which is formed by winding a rubber thread around the center in an elongated state can be used. In the present invention, the rubber thread, which is conventionally used for winding around the center, can be adopted for winding around the center. The rubber thread, for example, is obtained by vulcanizing a rubber composition including a natural rubber, or a mixture of a natural rubber and a synthetic polyisoprene, a sulfur, a vulcanization auxiliary agent, a vulcanization accelerator, and an antioxidant. The rubber thread is wound around the center in elongation of about 10 times length to form the wound core.

When the golf ball of the present invention has a diameter in a range from 40 mm to 45 mm, a compression deformation amount of the golf ball (an amount of compression of the golf ball in the compression direction thereof) when applying an initial load of 98 N to a final load of 1275 N to the golf ball is preferably 2.5 mm or more, more preferably 2.7 mm or more, and even more preferably 3.0 mm or more, and is preferably 4.0 mm or less, more preferably 3.7 mm or less, and even more preferably 3.4 mm or less. By causing the compression deformation amount to be 2.5 mm or more, desirable shot feeling is obtained. By causing the compression deformation amount to be 4.0 mm or less, desirable repulsion is obtained.

EXAMPLES

Hereinafter, the present invention will be described in detail by way of example. The present invention is not limited to examples described below. Various changes and modifications can be made without departing from the spirit and scope of the present invention.

(1) Slab Hardness (Shore D Hardness)

Sheets with a thickness of about 2 mm were produced by press molding a cover composition, an intermediate layer composition or a surrounding layer composition, and stored at 23° C. for two weeks. Three or more of these sheets were stacked on one another so as not to be affected by the measuring base on which the sheets were placed, and the stack was measured with a type LA1 auto loading durometer manufactured by Kobunshi Keiki Co., Ltd., provided with a Shore D type spring hardness tester prescribed in ASTM-D2240.

(2) Center Hardness of the Center, and Surface Hardness of the Core and the Center (Shore D Hardness)

A type LA1 auto loading durometer manufactured by Kobunshi Keiki Co., Ltd., provided with a Shore D type spring hardness tester prescribed in ASTM-D2240 was used to measure the surface hardness of the center, and the core. Shore D hardness measured at the surfaces of the center and the core are defined as the surface hardness of the center and the core, respectively. The core was cut into two hemispheres to obtain a cut plane, and a Shore D hardness measured at the center of the cut plane was used as the center hardness of the center or the core.

(3) Density of the Intermediate Layer

The intermediate layer composition was formed into a pellet, and the density of the pellet was measured in a solvent of ethanol with ARCHIMEDES available from Chyo balance Corporation.

(4) Flexural Modulus (MPa)

(A) Test pieces with a length of 80.0±2 mm, a width of 10.0±0.2 mm, and a thickness of 4.0±0.2 mm were produced by injection molding using a dry pellet of (A) the highly elastic polyamide resin, and immediately stored at 23° C.±2° C. for 24 hours or more in a moisture-proof container. The test pieces were taken out from the moisture-proof container and immediately (within 15 minutes) the flexural modulus of the test pieces were measured according to ISO178. The measurement was conducted at a temperature of 23° C. and a humidity of 50% RH.

(B) Test pieces with a length of 80.0±2 mm, a width of 10.0±0.2 mm, and a thickness of 4.0±0.2 mm were produced by injection molding using (B) the metal neutralized copolymer or the cover composition, and stored at 23° C. for two weeks under the humidity of 50% RH. The flexural modulus of the test pieces were measured according to ISO178. The measurement was conducted at a temperature of 23° C. and a humidity of 50% RH.

(5) Tensile Modulus (MPa)

A sheet with a thickness of about 2 mm was produced by injection molding a cover composition, and stored at 23° C. for two weeks. A dumbbell-shaped test piece was produced from this sheet, and the tensile modulus of the test piece was measured according to ISO 527-1.

(6) Compression Deformation Amount (mm)

A compression deformation amount of the golf ball, the core or the center (a shrinking amount of the golf ball, the core or the center in the compression direction thereof), when applying an initial load of 98 N to a final load of 1275 N, was measured.

(7) Flight Distance

A metal-headed W#1 driver (XXIO S shaft, loft: 10°, manufactured by SRI Sports Limited) was installed on a swing robot M/C manufactured by TRUETEMPER CO. Golf balls were hit at a head speed of 45 m/sec, and the flight distances (the distance from the launch point to the stop point) were measured. This measurement was conducted ten times for each golf ball, and the average value was used as the measurement value for the golf ball.

(8) Direction Stability

A metal-headed W#1 driver (XXIO S shaft, loft: 10°, manufactured by SRI Sports Limited) was installed on a swing robot M/C manufactured by TRUETEMPER CO so that the club face is in a direction orthogonal to the hitting direction. Then, golf balls were hit with a driver having club face open by 2° and close by 2° to the hitting direction, respectively. The distances between the stop point hit with a driver having a club face open by 2° and the stop point hit with a driver having a club face close by 2° were measured. The parallel lines to the hitting direction were drawn to pass through the respective two stop points, and the distance between the parallel lines were measured. This measurement was conducted ten times for each golf ball, and the average value was used as the measurement value for the golf ball.

(9) Normal Temperature Durability

A metal-head driver was installed on a swing robot manufactured by TRUETEMPER CO, and the head speed was set to 45 m/sec. Each golf ball was stored in a constant temperature reservoir kept at the temperature of 23° C. for 12 hours, and then hit with a driver at the speed of 45 m/sec. to collide with a metal board, immediately after the golf balls were taken out from the constant temperature reservoir. This procedure was repeated, and the number of hits required to break the golf ball was counted. It is noted that there was a case where the golf ball looks unbroken but a crack occurs in the intermediate layer. In such a case, whether or not the golf ball was broken was determined based on deformation of the golf ball and difference in sound at hitting of the golf ball. For golf balls No. 1 to 23, the number of hits for golf ball No. 16 was defined as an index of 100, and the normal temperature durability of each golf ball was represented by converting the number of hits for each golf ball into this index. For golf balls No. 24 to 47, the number of hits for golf ball No. 43 was defined as an index of 100, and the normal temperature durability of each golf ball was represented by converting the number of hits for each golf ball into this index. A greater index value indicates that the durability of the golf ball is excellent.

(10) Low Temperature Durability

A metal-head driver was installed on a swing robot manufactured by TRUETEMPER CO, and the head speed was set to 45 m/sec. Each golf ball was stored in a constant temperature reservoir kept at the temperature of −10° C. for 24 hours, and then hit with a driver at the speed of 45 m/sec. to collide with a metal board, immediately after the golf balls were taken out from the constant temperature reservoir. This procedure was repeated, and the number of hits required to break the golf ball was counted. It is noted that there was a case where the golf ball looks unbroken but a crack occurs in the intermediate layer. In such a case, whether or not the golf ball was broken was determined based on deformation of the golf ball and difference in sound at hitting of the golf ball. For golf balls No. 1 to No. 23, the number of hits for golf ball No. 16 was defined as an index of 100, and the low-temperature durability of each golf ball was represented by converting the number of hits for each golf ball into this index. For golf balls No. 24 to No. 47, the number of hits for golf ball No. 43 was defined as an index of 100, and the low-temperature durability of each golf ball was represented by converting the number of hits for each golf ball into this index. A greater index value indicates that the durability of the golf ball is excellent.

(11) Shot Feeling

An actual hitting test was carried out by ten amateur golfers (high skilled person) using a driver (#W1 driver), and the shot feeling was evaluated according to the following four criteria.
  E(Excellent): Extremely good (soft feeling)
  G(Good): Good (Relatively soft feeling)
  F(Fair): Slightly poor (Relatively hard feeling)
  P(Poor): Poor (Hard feeling)

[Production of Golf Balls No. 1 to No. 23]

(1) Production of Core

Cores were obtained by kneading rubber compositions having the formulation shown in Table 1, and heat-pressing the kneaded material in upper and lower molds, each having a hemispherical cavity, at 170° C. for 30 minutes.

It is noted that an appropriate amount of barium sulfate was added such that the obtained golf ball had a mass of 45.4 g.

(2) Preparation of Cover Composition and Intermediate Layer Composition

Blending materials shown in Tables 2 and 4 to 8 were mixed with a twin-screw kneading extruder to prepare cover compositions in the pellet form and intermediate layer compositions in the pellet form, respectively. The extruding conditions were a screw diameter of 45 mm, a screw rotational speed of 200 rpm, and screw L/D=35, and the mixtures were heated to 160 to 230° C. at the die position of the extruder.

TABLE 2

| Intermediate layer composition | | A | B | C | D | E |
|---|---|---|---|---|---|---|
| Formulation | Surlyn 8945 | 35 | 35 | 35 | 35 | 48 |
| | Himilan AM7329 | 35 | 35 | 35 | 35 | 30 |
| | Rabalon T3221C | 30 | 30 | 30 | 30 | 22 |
| | Tungsten | — | 20 | 32 | 43 | 32 |
| Slab hardness H4 (Shore D) | | 47 | 47 | 47 | 47 | 53 |
| Density (g/cm$^3$) | | 0.94 | 1.12 | 1.22 | 1.32 | 1.22 |

Formulation: parts by mass
Note on table 7:
Surlyn 8945: Sodium ion neutralized ethylene-methacrylic acid copolymer ionomer resin available from E. I. du Pont de Nemours and Company
Himilan AM7329: Zinc ion neutralized ethylene-methacrylic acid copolymer ionomer resin available from Du Pont-Mitsui Polychemicals Co., Ltd
Rabalon T3221C: Polystyrene elastomer available from Mitsubishi Chemical Corporation.
Tungsten: Tungsten powder C50G available from A.L.M.T. Corp.

(3) Production of Golf Ball Body

The intermediate layer compositions obtained above were injection-molded onto the spherical cores to form the intermediate layers covering the cores. Subsequently, golf balls were produced by injection-molding the cover composition onto the intermediate layer to form a cover. Upper and lower molds have a spherical cavity with pimples, a part of which serves as a hold pin which is extendable and retractable. The hold pins were protruded to hold the core, the resin heated to 210° C. was charged into the mold under a pressure of 80 tons within 0.3 seconds, and cooled for 30 seconds. Then, the mold was opened, and the golf ball body were taken out from the mold. The surface of the obtained golf ball body were treated with sandblast, marked, and painted with a clear paint. The paint was dried in an oven at 40° C., and golf balls having a diameter of 42.8 mm and a mass of 45.4 g were obtained.

Figure 2:
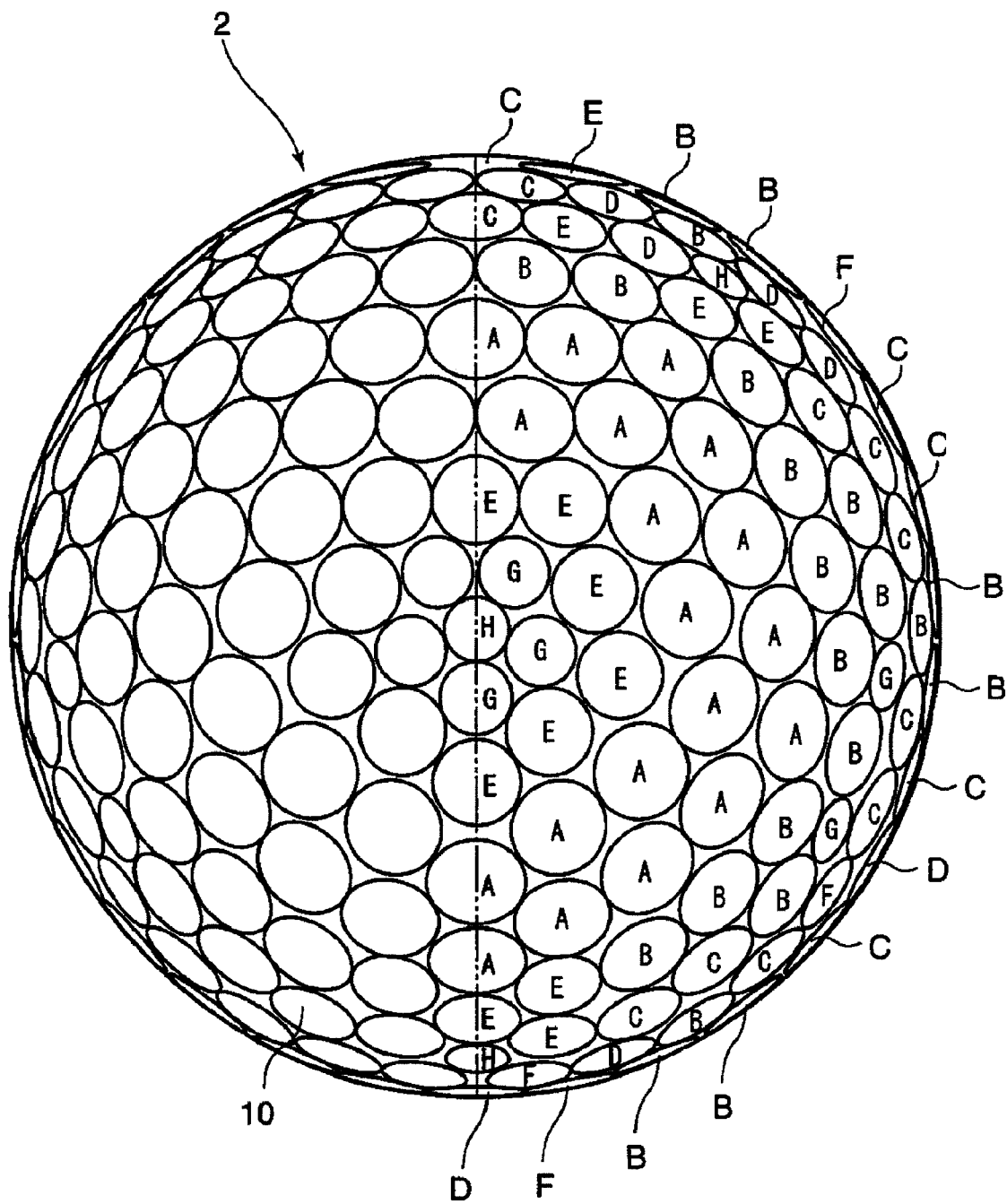
FIG. 2 is a top plan view of the dimple pattern formed on the surface of the golf ball.
Figure 3:
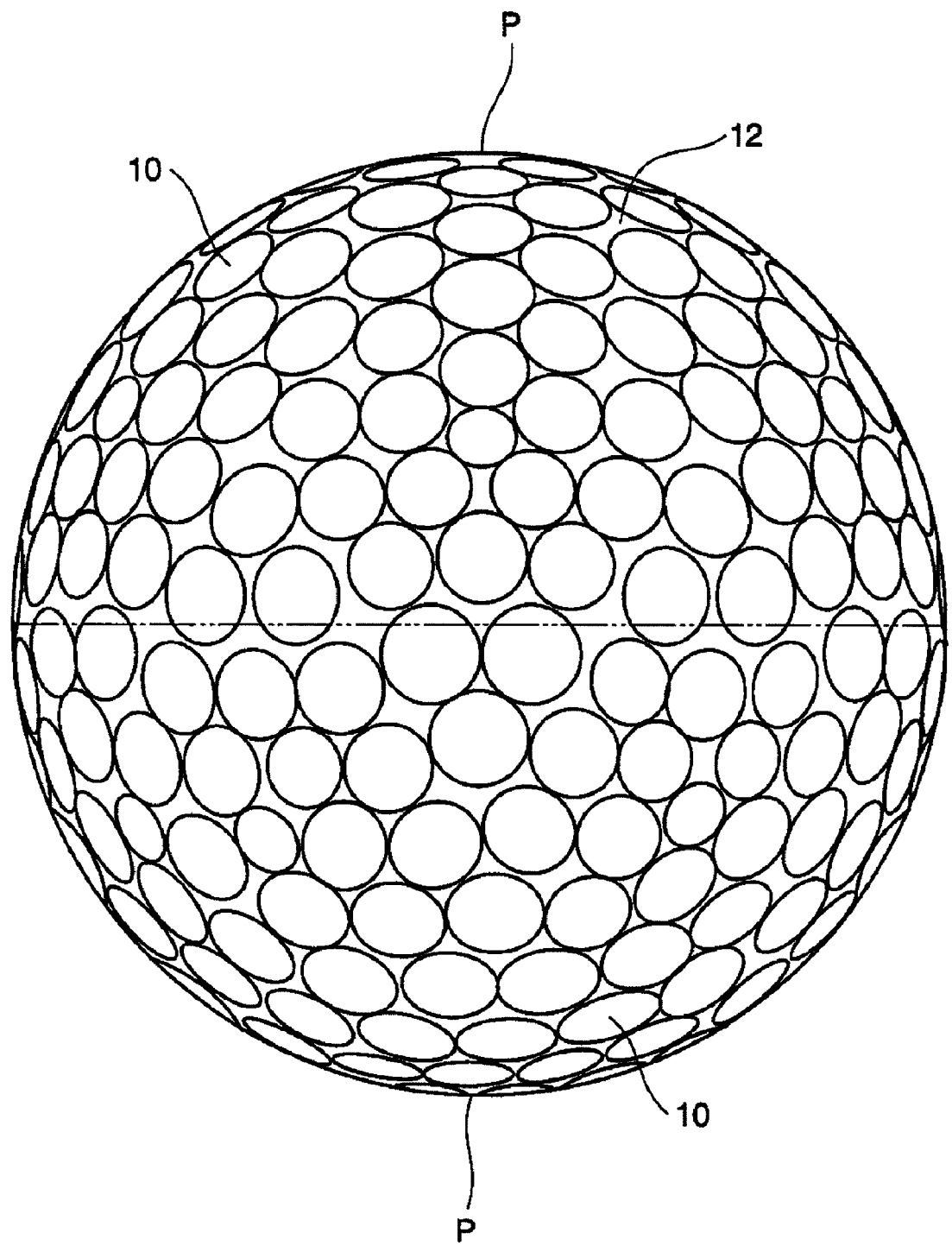
FIG. 3 is a front view of the dimple pattern formed on the surface of the golf ball.

The dimple patterns shown in table 3 and FIG. 2 and FIG. 3 were formed on the surface of the golf ball. In table 3, "diameter" of the dimple is depicted by Di in FIG. 1 and "depth" means a distance between the tangential line and the deepest portion De. P means Pole in FIG. 3.

TABLE 1

| | Core No. | 1 | 2 | 3 | 4 | 5 |
|---|---|---|---|---|---|---|
| Formulation | Polybutadiene | 100 | 100 | 100 | 100 | 100 |
| | Zinc acrylate | 28.5 | 27.5 | 27.0 | 29.5 | 29.0 |
| | Zinc oxide | 10 | 10 | 10 | 10 | 10 |
| | Barium sulfate | Appropriate Amount*) | Appropriate Amount*) | Appropriate Amount*) | Appropriate Amount*) | Appropriate Amount*) |
| | Diphenyl disulfide | 0.5 | 0.5 | 0.5 | 0.5 | 0.5 |
| | Dicumyl peroxide | 0.8 | 0.8 | 0.8 | 0.8 | 0.8 |

Formulation: parts by mass
*)The amount of Barium sulfate was adjusted such that the golf ball had a mass of 45.4 g.
Polybutadiene rubber: "BR-730 (high-cis polybutadiene)" manufactured by JSR Corporation.
Zinc acrylate: "ZNDA-90S" manufactured by Nihon Jyoryu Kogyo Co., Ltd.
Zinc oxide: "Ginrei R" manufactured by Toho Zinc Co., Ltd.
Barium sulfate: "Barium Sulfate BD" manufactured by Sakai Chemical Industry Co., Ltd.
Diphenyl disulfide: manufactured by Sumitomo Seika Chemicals Co., Ltd.
Dicumyl peroxide: "Percumyl (registered trademark) D" manufactured by NOF Corporation.

TABLE 3

| Kinds | Number | Diameter (mm) | Depth (mm) | Curvature radius (mm) | Area (mm²) | Occupancy (%) | Plan view | Front view |
|---|---|---|---|---|---|---|---|---|
| A | 70 | 4.65 | 0.1380 | 19.65 | 1188.2 | 82.1 | FIG. 2 | FIG. 3 |
| B | 88 | 4.45 | 0.1380 | 18.01 | 1368.0 | | | |
| C | 56 | 4.30 | 0.1380 | 16.82 | 812.8 | | | |
| D | 26 | 4.20 | 0.1380 | 16.05 | 360.0 | | | |
| E | 42 | 4.10 | 0.1380 | 15.30 | 554.2 | | | |
| F | 20 | 3.90 | 0.1380 | 13.85 | 238.8 | | | |
| G | 18 | 3.20 | 0.1380 | 9.34 | 144.7 | | | |
| H | 8 | 3.00 | 0.1380 | 8.22 | 56.5 | | | |
| Total | 328 | — | — | — | 4723.2 | | | |

The results of evaluations of the golf balls were also shown in tables 4 to 8.

TABLE 4

| | Golf ball No. | | | 1 | 2 | 3 | 4 | 5 |
|---|---|---|---|---|---|---|---|---|
| Core | Core composition No. | | | 5 | 1 | 2 | 1 | 1 |
| | Diameter | | (mm) | 40.2 | 39.8 | 39.4 | 39.8 | 39.8 |
| | Core center hardness H1 | | Shore D | 39.5 | 39 | 38 | 39 | 39 |
| | Core surface hardness H3 | | Shore D | 52.5 | 52 | 51 | 52 | 52 |
| | Hardness difference(H3 − H1) | | Shore D | 13 | 13 | 13 | 13 | 13 |
| Intermediate layer | Intermediate layer composition No. | | | C | C | C | C | C |
| | Density | | g/cm³ | 1.22 | 1.22 | 1.22 | 1.22 | 1.22 |
| | Slab hardness H4 | | Shore D | 47 | 47 | 47 | 47 | 47 |
| | Thickness | | (mm) | 0.8 | 0.8 | 0.8 | 0.8 | 0.8 |
| Cover composition | Formulation | (B) | SURLYN 8945 | 30 | 30 | 30 | 40 | 30 |
| | | | HIMILAN AM7329 | 40 | 40 | 40 | 50 | 40 |
| | | | SURLYN 8140 | — | — | — | — | — |
| | | | SURLYN 9120 | — | — | — | — | — |
| | | (A) | NOVAMID ST220 | 30 | 30 | 30 | 10 | 30 |
| | | | AMILAN U141 | — | — | — | — | — |
| | | (C) | LOTADER AX8840 | 5 | 5 | 5 | 5 | 3 |
| | | | ARUFON UG-4030 | — | — | — | — | 2 |
| | | | Titanium oxide | 3 | 3 | 3 | 3 | 3 |
| | | | Ultra marine blue | 0.04 | 0.04 | 0.04 | 0.04 | 0.04 |
| | Slab | | Slab hardness H5 (Shore D) | 67 | 67 | 67 | 66 | 68 |
| | Properties | | Bending modulus (MPa) | 460 | 460 | 460 | 365 | 480 |
| | | | Tensile modulus (MPa) | 570 | 570 | 570 | 420 | 590 |
| | | | Thickness (mm) | 0.5 | 0.7 | 0.9 | 0.7 | 0.7 |
| Golf ball evaluation | Compression deformation amount (mm) | | | 3.3 | 3.3 | 3.3 | 3.3 | 3.3 |
| | Flight distance (m) | | | 237 | 236 | 233 | 233 | 235 |
| | Direction stability (m) | | | 3.4 | 3.7 | 4.8 | 3.9 | 3.8 |
| | Normal-temperature Durability | | | 110 | 120 | 123 | 110 | 125 |
| | Low-temperature Durability | | | 108 | 130 | 135 | 115 | 135 |
| | Shot feeling | | | E | E | G | E | E |

TABLE 5

| | Golf ball No. | | | 6 | 7 | 8 | 9 | 10 |
|---|---|---|---|---|---|---|---|---|
| Core | Core composition No. | | | 1 | 1 | 1 | 1 | 1 |
| | Diameter | | (mm) | 39.8 | 39.8 | 39.8 | 39.8 | 39.8 |
| | Core center hardness H1 | | Shore D | 39 | 39 | 39 | 39 | 39 |
| | Core surface hardness H3 | | Shore D | 52 | 52 | 52 | 52 | 52 |
| | Hardness difference(H3 − H1) | | Shore D | 13 | 13 | 13 | 13 | 13 |
| Intermediate layer | Intermediate layer composition No. | | | C | C | C | C | C |
| | Density | | g/cm³ | 1.22 | 1.22 | 1.22 | 1.22 | 1.22 |
| | Slab hardness H4 | | Shore D | 47 | 47 | 47 | 47 | 47 |
| | Thickness | | (mm) | 0.8 | 0.8 | 0.8 | 0.8 | 0.8 |
| Cover composition | Formulation | (B) | SURLYN 8945 | 15 | 30 | 30 | 30 | 20 |
| | | | HIMILAN AM7329 | 15 | 40 | 40 | 40 | 20 |
| | | | SURLYN 8140 | — | — | — | — | — |
| | | | SURLYN 9120 | — | — | — | — | — |
| | | (A) | NOVAMID ST220 | 70 | 30 | 30 | 30 | — |
| | | | AMILAN U141 | — | — | — | — | 60 |
| | | (C) | LOTADER AX8840 | 5 | 1 | 3 | 18 | 5 |
| | | | ARUFON UG-4030 | — | — | — | — | — |

TABLE 5-continued

| | Golf ball No. | | 6 | 7 | 8 | 9 | 10 |
|---|---|---|---|---|---|---|---|
| | | Titanium oxide | 3 | 3 | 3 | 3 | 3 |
| | | Ultra marine blue | 0.04 | 0.04 | 0.04 | 0.04 | 0.04 |
| | Slab Properties | Slab hardness H5 (Shore D) | 73 | 68 | 67 | 65 | 70 |
| | | Bending modulus (MPa) | 530 | 450 | 455 | 335 | 495 |
| | | Tensile modulus (MPa) | 875 | 545 | 560 | 395 | 620 |
| | | Thickness (mm) | 0.7 | 0.7 | 0.7 | 0.7 | 0.7 |
| Golf ball evaluation | Compression deformation amount (mm) | | 3.3 | 3.3 | 3.3 | 3.3 | 3.2 |
| | Flight distance (m) | | 232 | 234 | 236 | 233 | 236 |
| | Direction stability (m) | | 3.8 | 3.7 | 3.7 | 4.0 | 3.5 |
| | Normal-temperature Durability | | 114 | 110 | 112 | 125 | 135 |
| | Low-temperature Durability | | 120 | 115 | 120 | 135 | 140 |
| | Shot feeling | | G | E | E | E | E |

15

TABLE 6

| | Golf ball No. | | | 11 | 12 | 13 | 14 | 15 |
|---|---|---|---|---|---|---|---|---|
| Core | Core composition No. | | | 2 | 1 | 1 | 1 | 1 |
| | Diameter | | (mm) | 39.8 | 39.8 | 39.8 | 39.8 | 39.8 |
| | Core center hardness H1 | | Shore D | 38 | 39 | 39 | 39 | 39 |
| | Core surface hardness H3 | | Shore D | 51 | 52 | 52 | 52 | 52 |
| | Hardness difference(H3 − H1) | | Shore D | 13 | 13 | 13 | 13 | 13 |
| Intermediate layer | Intermediate layer composition No. | | | E | B | D | A | C |
| | Density | | g/cm³ | 1.22 | 1.12 | 1.32 | 0.94 | 1.22 |
| | Slab hardness H4 | | Shore D | 53 | 47 | 47 | 47 | 47 |
| | Thickness | | (mm) | 0.8 | 0.8 | 0.8 | 0.8 | 0.8 |
| Cover composition | Formulation | (B) | SURLYN 8945 | 30 | 30 | 30 | 30 | 40 |
| | | | HIMILAN AM7329 | 40 | 40 | 40 | 40 | 60 |
| | | | SURLYN 8140 | — | — | — | — | — |
| | | | SURLYN 9120 | — | — | — | — | — |
| | | (A) | NOVAMID ST220 | 30 | 30 | 30 | 30 | — |
| | | | AMILAN U141 | — | — | — | — | — |
| | | (C) | LOTADER AX8840 | 5 | 5 | 5 | 5 | — |
| | | | ARUFON UG-4030 | — | — | — | — | — |
| | Titanium oxide | | | 3 | 3 | 3 | 3 | 3 |
| | Ultra marine blue | | | 0.04 | 0.04 | 0.04 | 0.04 | 0.04 |
| | Slab Properties | Slab hardness H5 (Shore D) | | 67 | 67 | 67 | 67 | 64 |
| | | Bending modulus (MPa) | | 460 | 460 | 460 | 460 | 350 |
| | | Tensile modulus (MPa) | | 570 | 570 | 570 | 570 | 345 |
| | | Thickness (mm) | | 0.7 | 0.7 | 0.7 | 0.7 | 0.7 |
| Golf ball evaluation | Compression deformation amount (mm) | | | 3.3 | 3.3 | 3.3 | 3.3 | 3.4 |
| | Flight distance (m) | | | 236 | 234 | 237 | 233 | 230 |
| | Direction stability (m) | | | 3.8 | 4.9 | 3.5 | 6.0 | 6.3 |
| | Normal-temperature Durability | | | 115 | 120 | 120 | 120 | 103 |
| | Low-temperature Durability | | | 130 | 130 | 130 | 130 | 108 |
| | Shot feeling | | | G | E | E | E | E |

TABLE 7

| | Golf ball No. | | | 16 | 17 | 18 | 19 | 20 |
|---|---|---|---|---|---|---|---|---|
| Core | Core composition No. | | | 1 | 4 | 3 | 1 | 1 |
| | Diameter | | (mm) | 39.8 | 40.8 | 39.0 | 39.8 | 39.8 |
| | Core center hardness H1 | | Shore D | 39 | 40 | 37 | 39 | 39 |
| | Core surface hardness H3 | | Shore D | 52 | 53 | 50 | 52 | 52 |
| | Hardness difference(H3 − H1) | | Shore D | 13 | 13 | 13 | 13 | 13 |
| Intermediate layer | Intermediate layer composition No. | | | C | C | C | C | C |
| | Density | | g/cm³ | 1.22 | 1.22 | 1.22 | 1.22 | 1.22 |
| | Slab hardness H4 | | Shore D | 47 | 47 | 47 | 47 | 47 |
| | Thickness | | (mm) | 0.8 | 0.8 | 0.8 | 0.8 | 0.8 |
| Cover composition | Formulation | (B) | SURLYN 8945 | — | 30 | 30 | 40 | 5 |
| | | | HIMILAN AM7329 | — | 40 | 40 | 57 | 10 |
| | | | SURLYN 8140 | 40 | — | — | — | — |
| | | | SURLYN 9120 | 60 | — | — | — | — |
| | | (A) | NOVAMID ST220 | — | 30 | 30 | 3 | 85 |
| | | | AMILAN U141 | — | — | — | — | — |
| | | (C) | LOTADER AX8840 | — | 5 | 5 | 5 | 5 |
| | | | ARUFON UG-4030 | — | — | — | — | — |
| | Titanium oxide | | | 3 | 3 | 3 | 3 | 3 |

TABLE 7-continued

| | | Golf ball No. | 16 | 17 | 18 | 19 | 20 |
|---|---|---|---|---|---|---|---|
| | | Ultra marine blue | 0.04 | 0.04 | 0.04 | 0.04 | 0.04 |
| | Slab | Slab hardness H5 (Shore D) | 67 | 67 | 67 | 64 | 76 |
| | Properties | Bending modulus (MPa) | 430 | 460 | 460 | 360 | 700 |
| | | Tensile modulus (MPa) | 512 | 570 | 570 | 380 | 890 |
| | | Thickness (mm) | 0.7 | 0.2 | 1.1 | 0.7 | 0.7 |
| Golf ball | Compression deformation amount (mm) | | 3.3 | 3.3 | 3.3 | 3.4 | 3.2 |
| evaluation | Flight distance (m) | | 230 | 237 | 231 | 230 | 231 |
| | Direction stability (m) | | 3.9 | 3.6 | 6.5 | 4.4 | 3.8 |
| | Normal-temperature Durability | | 100 | 85 | 126 | 103 | 110 |
| | Low-temperature Durability | | 100 | 92 | 138 | 105 | 118 |
| | Shot feeling | | F | E | P | E | P |

TABLE 8

| | | Golf ball No. | | 21 | 22 | 23 |
|---|---|---|---|---|---|---|
| Core | Core composition No. | | | 1 | 1 | 1 |
| | Diameter | | (mm) | 39.8 | 39.8 | 39.8 |
| | Core center hardness H1 | | Shore D | 39 | 39 | 39 |
| | Core surface hardness H3 | | Shore D | 52 | 52 | 52 |
| | Hardness difference(H3 − H1) | | Shore D | 13 | 13 | 13 |
| Intermediate | Intermediate layer composition No. | | | C | C | C |
| layer | Density | | g/cm$^3$ | 1.22 | 1.22 | 1.22 |
| | Slab hardness H4 | | Shore D | 47 | 47 | 47 |
| | Thickness | | (mm) | 0.8 | 0.8 | 0.8 |
| Cover | Formulation | (B) | SURLYN 8945 | 30 | 30 | 30 |
| composition | | | HIMILAN AM7329 | 40 | 40 | 40 |
| | | | SURLYN 8140 | — | — | — |
| | | | SURLYN 9120 | — | — | — |
| | | (A) | NOVAMID ST220 | 30 | 30 | 30 |
| | | | AMILAN U141 | — | — | — |
| | | (C) | LOTADER AX8840 | — | 0.05 | 25 |
| | | | ARUFON UG-4030 | — | — | — |
| | | | Titanium oxide | 3 | 3 | 3 |
| | | | Ultra marine blue | 0.04 | 0.04 | 0.04 |
| | Slab | | Slab hardness H5 (Shore D) | 68 | 68 | 63 |
| | Properties | | Bending modulus (MPa) | 485 | 445 | 285 |
| | | | Tensile modulus (MPa) | 600 | 530 | 340 |
| | | | Thickness (mm) | 0.7 | 0.7 | 0.7 |
| Golf ball | Compression deformation amount (mm) | | | 3.2 | 3.3 | 3.4 |
| evaluation | Flight distance (m) | | | 230 | 233 | 230 |
| | Direction stability (m) | | | 3.8 | 3.6 | 6.2 |
| | Normal-temperature Durability | | | 95 | 100 | 128 |
| | Low-temperature Durability | | | 90 | 98 | 140 |
| | Shot feeling | | | P | E | E |

Notes on tables 4 to 8
Formulation: parts by mass
SURLYN 8945: a sodium ion neutralized ethylene-methacrylic acid copolymer ionomer resin (flexural modulus: 254 MPa) available from E. I. du Pont de Nemours and Company.
HIMILAN AM7329: a zinc ion neutralized ethylene-methacrylic acid copolymer ionomer resin (flexural modulus: 236 MPa) available from Du Pont-Mitsui Polychemicals Co., Ltd.
SURLYN 8140: a sodium ion neutralized ethylene-methacrylic acid copolymer ionomer resin available from E. I. du Pont de Nemours and Company.
SURLYN 9120: a zinc ion neutralized ethylene-methacrylic acid copolymer ionomer resin available from E. I. du Pont de Nemours and Company.
LOTADER AX8840: an ethylene-acrylic acid-glycidyl methacrylate copolymer (amount of monomer containing a polar functional group: 8 mass %) available from Tokyo Zairyo Co., Ltd.
AFURON UG-4030: a methyl methacrylate-glycidyl methacrylate copolymer (amount of monomer containing a polar functional group: 0.02 mass %, epoxy number: 1.8 meq/g) available from Toagosei Co., Ltd.
NOVAMID ST220: Polyamide resin (High impact resistance grade, flexural modulus: 2,000 MPa) available from Mitsubishi Engineering-Plastics Company.
AMILAN U141: Polyamide resin (Super high impact resistance grade, flexural modulus: 1,500 MPa)
Ultramarine blue: Ultramarine blue No1500 available from Daiichi Kogyou Company Each of Golf balls No. 1 to 14 is the case that the cover is formed from the cover composition that contains (A) component, (B) component, and (C) component in a specific amount and that the cover has a thickness ranging from 0.3 mm to 1.0 mm and the cover composition has a slab hardness from 65 to 75 in Shore D hardness. It is obvious that golf balls No. 1 to 14 have improved flight distance, durability at normal and low temperatures, and shot feeling, if compared to the golf ball No. 16 that has a cover formed from the cover composition consisting of an ionomer resin as a resin component. Among them, the golf balls No. 1 to 13 where the intermediate layer composition has a density of 1.10 g/cm$^3$ or more showed an excellent direction stability.

Golf ball No. 15 is the case that the cover is formed from the cover composition consisting of an ionomer resin which is different from that of the Golf ball No. 16 as a resin component. Although the durability at normal and low temperatures and the shot feeling were excellent, the flight distance was not improved. Golf ball No. 17 is the case that the cover has a thickness less than 0.3 mm. The durability at normal and low temperatures were inferior, although the flight distance and the shot feeling were excellent. Golf ball No. 18 is the case that the cover has a thickness more than 1.0 mm. The shot feeling was inferior, although the durability at normal and low temperatures were excellent.

Golf ball No. 19 is the case that the cover composition has a slab hardness H5 less than 65 in Shore D hardness. The flight distance was not improved, although the durability at normal and low temperatures and the shot feeling were improved. Golf ball No. 20 is the case the cover composition has a slab hardness H5 more than 75 in Shore D hardness. The shot feeling was poor, although the flight distance was excellent.

Golf ball No. 21 is the case that the cover composition does not contain the (C) component. The flight distance and the durability at normal and low temperatures were all inferior. Golf ball No. 22 is the case that the content of the (C) component was less than 0.1 part by mass with respect to 100 parts by mass of a sum of the (A) component and (B) component. The improved effect on the durability at normal and low temperatures was small, although the flight distance and the shot feeling were excellent. Golf ball No. 23 is the case that the content of the (C) component was more than 20 parts by mass with respect to 100 parts by mass of a sum of the (A) component and (B) component. The flight distance was lowered, although the durability at normal and low temperatures and the shot feeling were excellent.

According to the present invention, a golf ball excellent in the durability at the normal and low temperatures, flight distance and shot feeling on the shots is obtained. Further, according to the present invention, a golf ball excellent in the direction stability is obtained.

[Production of Golf Balls No. 24 to No. 47]

(1) Production of Center

Centers were obtained by kneading rubber compositions having the formulation shown in Table 9, and heat-pressing the kneaded material in upper and lower molds, each having a hemispherical cavity, at 170° C. for 20 minutes.

TABLE 9

| Center Composition No. | 1 | 2 | 3 |
|---|---|---|---|
| Formulation | Polybutadiene | 100 | 100 | 100 |
| | Zinc acrylate | 26 | 25 | 27 |
| | Zinc oxide | 10 | 10 | 10 |
| | Barium sulfate | Appropriate Amount*) | Appropriate Amount*) | Appropriate Amount*) |
| | Diphenyl disulfide | 0.5 | 0.5 | 0.5 |
| | Dicumyl peroxide | 0.8 | 0.8 | 0.8 |

Formulation: parts by mass
*)The amount of Barium sulfate was adjusted such that the golf ball had a mass of 45.4 g.
Polybutadiene rubber: "BR-730 (high-cis polybutadiene)" manufactured by JSR Corporation.
Zinc acrylate: "ZNDA-90S" manufactured by Nihon Jyoryu Kogyo Co., Ltd.
Zinc oxide: "Ginrei R" manufactured by Toho Zinc Co., Ltd.
Barium sulfate: "Barium Sulfate BD" manufactured by Sakai Chemical Industry Co., Ltd.
Diphenyl disulfide: manufactured by Sumitomo Seika Chemicals Co., Ltd.
Dicumyl peroxide: "Percumyl (registered trademark) D" manufactured by NOF Corporation.

It is noted that an appropriate amount of barium sulfate was added such that the obtained golf ball had a mass of 45.4 g.

(2) Preparation of the Surrounding Layer Composition

Blending materials shown in table 10 were mixed and kneaded to obtain the surrounding layer compositions. The obtained surrounding layer compositions were formed into the half hollow-shells. The centers were covered with a pair of the upper and lower half hollow-shells and subjected to the press-molding under the condition of 170° C. for 20 minutes in the upper and lower molds having spherical cavities to form the surrounding layer and obtain spherical cores having two layers.

TABLE 10

| Surrounding layer Composition No. | 1 | 2 | 3 | 4 |
|---|---|---|---|---|
| Formulation | Polybutadiene | 100 | 100 | 100 | 100 |
| | Zinc acrylate | 37 | 30 | 15 | 22 |
| | Zinc oxide | 5 | 5 | 5 | 5 |
| | Barium sulfate | 10 | 10 | 10 | 10 |
| | Diphenyl disulfide | 0.5 | 0.5 | 0.5 | 0.5 |
| | Dicumyl peroxide | 0.8 | 0.8 | 0.8 | 0.8 |

Formulation: parts by mass
Polybutadiene rubber: "BR-730 (high-cis polybutadiene)" manufactured by JSR Corporation.
Zinc acrylate: "ZNDA-90S" manufactured by Nihon Jyoryu Kogyo Co., Ltd.
Zinc oxide: "Ginrei R" manufactured by Toho Zinc Co., Ltd.
Barium sulfate: "Barium Sulfate BD" manufactured by Sakai Chemical Industry Co., Ltd.
Diphenyl disulfide: manufactured by Sumitomo Seika Chemicals Co., Ltd.
Dicumyl peroxide: "Percumyl (registered trademark) D" manufactured by NOF Corporation.

(3) Preparation of Cover Composition and Intermediate Layer Composition

Blending materials shown in Tables 11, 13, 14 to 17 were mixed with a twin-screw kneading extruder to prepare cover compositions in the pellet form and intermediate layer compositions in the pellet form, respectively. The extruding conditions were a screw diameter of 45 mm, a screw rotational speed of 200 rpm, and screw L/D=35, and the mixtures were heated to 160 to 230° C. at the die position of the extruder.

TABLE 11

| Intermediate layer composition | | B | C | D |
|---|---|---|---|---|
| Formulation | Surlyn 8945 | 35 | 35 | 35 |
| | Himilan AM7329 | 35 | 35 | 35 |
| | Rabalon T3221C | 30 | 30 | 30 |
| | Tungsten | 20 | 32 | 43 |
| Slab hardness H4 (Shore D) | | 47 | 47 | 47 |
| Density (g/cm$^3$) | | 1.12 | 1.22 | 1.32 |

Formulation: parts by mass
Note on table 11
Surlyn 8945: Sodium ion neutralized ethylene-methacrylic acid copolymer ionomer resin available from E. I. du Pont de Nemours and Company
Himilan AM7329: Zinc ion neutralized ethylene-methacrylic acid copolymer ionomer resin available from Du Pont-Mitsui Polychemicals Co., Ltd
Rabalon T3221C: Polystyrene elastomer available from Mitsubishi Chemical Corporation.
Tungsten: Tungsten powder C50G available from A.L.M.T. Corp.

(4) Production of Golf Ball Body

The intermediate layer compositions obtained above were injection-molded onto the spherical cores to form the intermediate layers covering the cores. Subsequently, golf balls were produced by injection-molding the cover composition onto the intermediate layer to form a cover. Upper and lower molds have a spherical cavity with pimples, a part of which serves as a hold pin which is extendable and retractable. The hold pins were protruded to hold the core, the resin heated to 210° C. was charged into the mold under a pressure of 80 tons within 0.3 seconds, and cooled for 30 seconds. Then, the mold was opened, and the golf ball body were taken out from the mold. The surface of the obtained golf ball body were treated with sandblast, marked, and painted with a clear paint. The paint was dried in an oven at 40° C., and golf balls having a diameter of 42.8 mm and a mass of 45.4 g were obtained.

The dimple patterns shown in table 12 and FIG. 2 and FIG. 3 were formed on the surface of the golf ball. In table 12, "diameter" of the dimple is depicted by Di in FIG. 1 and "depth" means a distance between the tangential line and the deepest portion De. P means Pole in FIG. 3.

TABLE 12

| Kinds | Number | Diameter (mm) | Depth (mm) | Curvature radius (mm) | Area (mm²) | Occupancy (%) | Plan view | Front view |
|---|---|---|---|---|---|---|---|---|
| A | 70 | 4.65 | 0.1380 | 19.65 | 1188.2 | 82.1 | FIG. 2 | FIG. 3 |
| B | 88 | 4.45 | 0.1380 | 18.01 | 1368.0 | | | |
| C | 56 | 4.30 | 0.1380 | 16.82 | 812.8 | | | |
| D | 26 | 4.20 | 0.1380 | 16.05 | 360.0 | | | |
| E | 42 | 4.10 | 0.1380 | 15.30 | 554.2 | | | |
| F | 20 | 3.90 | 0.1380 | 13.85 | 238.8 | | | |
| G | 18 | 3.20 | 0.1380 | 9.34 | 144.7 | | | |
| H | 8 | 3.00 | 0.1380 | 8.22 | 56.5 | | | |
| Total | 328 | — | — | — | 4723.2 | | | |

The results of evaluations of the golf balls were also shown in tables 13 to 17.

TABLE 13

| | | | Golf ball No. | 24 | 25 | 26 | 27 | 28 |
|---|---|---|---|---|---|---|---|---|
| Core | Center composition No. | | | 1 | 1 | 1 | 1 | 1 |
| | Center | Diameter (mm) | | 32.0 | 31.4 | 31.0 | 31.4 | 31.4 |
| | | Center hardness H1 (Shore D) | | 33 | 33 | 33 | 33 | 33 |
| | | Surface hardness H2 (Shore D) | | 51 | 51 | 51 | 51 | 51 |
| | | Compression deformation amount (mm) | | 4.7 | 4.7 | 4.7 | 4.7 | 4.7 |
| | Surrounding layer composition No. | | | 1 | 1 | 1 | 1 | 1 |
| | Thickness (mm) | | | 4.2 | 4.2 | 4.2 | 4.2 | 4.2 |
| | Properties | Core diameter (mm) | | 40.4 | 39.8 | 39.4 | 39.8 | 39.8 |
| | | Core surface hardness H3 (Shore D) | | 61 | 61 | 61 | 61 | 61 |
| | | Hardness difference(H3 − H1) (Shore D) | | 28 | 28 | 28 | 28 | 28 |
| | | Compression deformation amount (mm) | | 3.5 | 3.5 | 3.5 | 3.5 | 3.5 |
| Intermediate layer | Intermediate layer composition No. | | | C | C | C | C | C |
| | Density | g/cm³ | | 1.22 | 1.22 | 1.22 | 1.22 | 1.22 |
| | Thickness | (mm) | | 0.8 | 0.8 | 0.8 | 0.8 | 0.8 |
| Cover composition | Formulation | (B) | SURLYN 8945 | 30 | 30 | 30 | 30 | 30 |
| | | | HIMILAN AM7329 | 40 | 40 | 40 | 40 | 40 |
| | | | SURLYN 8140 | — | — | — | — | — |
| | | | SURLYN 9120 | — | — | — | — | — |
| | | (A) | NOVAMID ST220 | 30 | 30 | 30 | 30 | 30 |
| | | | AMILAN U141 | — | — | — | — | — |
| | | (C) | LOTADER AX8840 | 5 | 5 | 5 | 18 | 3 |
| | | | ARUFON UG-4030 | — | — | — | — | 2 |
| | | Titanium oxide | | 3 | 3 | 3 | 3 | 3 |
| | | Ultra marine blue | | 0.04 | 0.04 | 0.04 | 0.04 | 0.04 |
| | Slab Properties | Slab hardness H5 (Shore D) | | 67 | 67 | 67 | 65 | 68 |
| | | Bending modulus (MPa) | | 460 | 460 | 460 | 335 | 480 |
| | | Tensile modulus (MPa) | | 570 | 570 | 570 | 395 | 590 |
| | | Cover thickness (mm) | | 0.4 | 0.7 | 0.9 | 0.7 | 0.7 |
| Golf ball evaluation | Compression deformation amount (mm) | | | 3.3 | 3.2 | 3.1 | 3.2 | 3.2 |
| | Flight distance (m) | | | 238 | 237 | 235 | 233 | 236 |
| | Direction stability (m) | | | 3.5 | 3.6 | 3.8 | 4.0 | 3.9 |
| | Normal-temperature Durability | | | 117 | 120 | 122 | 124 | 124 |
| | Low-temperature Durability | | | 129 | 131 | 135 | 136 | 133 |
| | Shot feeling | | | E | E | E | E | E |

TABLE 14

| | | | Golf ball No. | 29 | 30 | 31 | 32 | 33 |
|---|---|---|---|---|---|---|---|---|
| Core | Center composition No. | | | 1 | 1 | 1 | 1 | 1 |
| | Center | Diameter (mm) | | 31.4 | 31.4 | 31.4 | 31.4 | 31.4 |
| | | Center hardness H1 (Shore D) | | 33 | 33 | 33 | 33 | 33 |
| | | Surface hardness H2 (Shore D) | | 51 | 51 | 51 | 51 | 51 |
| | | Compression deformation amount (mm) | | 4.7 | 4.7 | 4.7 | 4.7 | 4.7 |
| | Surrounding layer composition No. | | | 1 | 1 | 1 | 1 | 1 |
| | Thickness (mm) | | | 4.2 | 4.2 | 4.2 | 4.2 | 4.2 |
| | Properties | Core diameter (mm) | | 39.8 | 39.8 | 39.8 | 39.8 | 39.8 |
| | | Core surface hardness H3 (Shore D) | | 61 | 61 | 61 | 61 | 61 |
| | | Hardness difference(H3 − H1) (Shore D) | | 28 | 28 | 28 | 28 | 28 |
| | | Compression deformation amount (mm) | | 3.5 | 3.5 | 3.5 | 3.5 | 3.5 |

TABLE 14-continued

| | | | Golf ball No. | 29 | 30 | 31 | 32 | 33 |
|---|---|---|---|---|---|---|---|---|
| Intermediate layer | Intermediate layer composition No. | | | C | C | C | C | B |
| | Density | | g/cm³ | 1.22 | 1.22 | 1.22 | 1.22 | 1.12 |
| | Thickness | | (mm) | 0.8 | 0.8 | 0.8 | 0.8 | 0.8 |
| Cover composition | Formulation | (B) | SURLYN 8945 | 15 | 30 | 30 | 20 | 30 |
| | | | HIMILAN AM7329 | 15 | 40 | 40 | 20 | 40 |
| | | | SURLYN 8140 | — | — | — | — | — |
| | | | SURLYN 9120 | — | — | — | — | — |
| | | (A) | NOVAMID ST220 | 70 | 30 | 30 | — | 30 |
| | | | AMILAN U141 | — | — | — | 60 | — |
| | | (C) | LOTADER AX8840 | 5 | 1 | 3 | 5 | 5 |
| | | | ARUFON UG-4030 | — | — | — | — | — |
| | | | Titanium oxide | 3 | 3 | 3 | 3 | 3 |
| | | | Ultra marine blue | 0.04 | 0.04 | 0.04 | 0.04 | 0.04 |
| | Slab Properties | | Slab hardness H5 (Shore D) | 74 | 68 | 68 | 70 | 67 |
| | | | Bending modulus (MPa) | 530 | 480 | 485 | 495 | 460 |
| | | | Tensile modulus (MPa) | 875 | 590 | 600 | 620 | 570 |
| | | | Cover thickness (mm) | 0.7 | 0.7 | 0.7 | 0.7 | 0.7 |
| Golf ball evaluation | Compression deformation amount (mm) | | | 3.2 | 3.2 | 3.2 | 3.1 | 3.2 |
| | Flight distance (m) | | | 233 | 232 | 235 | 233 | 235 |
| | Direction stability (m) | | | 3.9 | 3.7 | 3.9 | 4.0 | 5.1 |
| | Normal-temperature Durability | | | 115 | 112 | 113 | 122 | 121 |
| | Low-temperature Durability | | | 121 | 118 | 122 | 131 | 130 |
| | Shot feeling | | | G | E | E | E | E |

TABLE 15

| | | | Golf ball No. | 34 | 35 | 36 | 37 | 38 |
|---|---|---|---|---|---|---|---|---|
| Core | Center composition No. | | | 1 | 2 | 1 | 2 | 2 |
| | Center | Diameter (mm) | | 31.4 | 25.0 | 31.4 | 25.0 | 25.0 |
| | | Center hardness H1(Shore D) | | 33 | 32 | 33 | 32 | 32 |
| | | Surface hardness H2 (Shore D) | | 51 | 50 | 51 | 50 | 50 |
| | | Compression deformation amount (mm) | | 4.7 | 4.9 | 4.7 | 4.7 | 4.7 |
| | Surrounding layer composition No. | | | 1 | 1 | 1 | 4 | 2 |
| | Thickness (mm) | | | 4.2 | 7.4 | 4.2 | 7.4 | 7.4 |
| | Properties | Core diameter (mm) | | 39.8 | 39.8 | 39.8 | 39.8 | 39.8 |
| | | Core surface hardness H3 (Shore D) | | 61 | 61 | 61 | 44 | 52 |
| | | Hardness difference(H3 − H1) (Shore D) | | 28 | 29 | 28 | 12 | 20 |
| | | Compression deformation amount (mm) | | 3.5 | 3.4 | 3.5 | 4.0 | 3.7 |
| Intermediate layer | Intermediate layer composition No. | | | C | C | D | C | C |
| | Density | | g/cm³ | 1.22 | 1.22 | 1.32 | 1.22 | 1.22 |
| | Thickness | | (mm) | 0.8 | 0.8 | 0.8 | 0.8 | 0.8 |
| Cover composition | Formulation | (B) | SURLYN 8945 | 40 | 30 | 30 | 30 | 30 |
| | | | HIMILAN AM7329 | 50 | 40 | 40 | 40 | 40 |
| | | | SURLYN 8140 | — | — | — | — | — |
| | | | SURLYN 9120 | — | — | — | — | — |
| | | (A) | NOVAMID ST220 | 10 | 30 | 30 | 30 | 30 |
| | | | AMILAN U141 | — | — | — | — | — |
| | | (C) | LOTADER AX8840 | 5 | 5 | 5 | 5 | 5 |
| | | | ARUFON UG-4030 | — | — | — | — | — |
| | | | Titanium oxide | 3 | 3 | 3 | 3 | 3 |
| | | | Ultra marine blue | 0.04 | 0.04 | 0.04 | 0.04 | 0.04 |
| | Slab Properties | | Slab hardness H5 (Shore D) | 66 | 67 | 67 | 67 | 67 |
| | | | Bending modulus (MPa) | 365 | 460 | 460 | 460 | 460 |
| | | | Tensile modulus (MPa) | 420 | 570 | 570 | 570 | 570 |
| | | | Cover thickness (mm) | 0.7 | 0.7 | 0.7 | 0.7 | 0.7 |
| Golf ball evaluation | Compression deformation amount (mm) | | | 3.2 | 3.1 | 3.2 | 3.6 | 3.3 |
| | Flight distance (m) | | | 232 | 238 | 239 | 233 | 236 |
| | Direction stability (m) | | | 4.0 | 3.5 | 3.6 | 3.8 | 3.5 |
| | Normal-temperature Durability | | | 111 | 119 | 122 | 123 | 121 |
| | Low-temperature Durability | | | 117 | 130 | 130 | 133 | 129 |
| | Shot feeling | | | E | E | E | E | E |

TABLE 16

| | | | Golf ball No. | 39 | 40 | 41 | 42 | 43 |
|---|---|---|---|---|---|---|---|---|
| Core | Center composition No. | | | 1 | 1 | 1 | 1 | 1 |
| | Center | Diameter (mm) | | 32.4 | 30.6 | 31.4 | 31.4 | 31.4 |

TABLE 16-continued

| | | | | Golf ball No. | 39 | 40 | 41 | 42 | 43 |
|---|---|---|---|---|---|---|---|---|---|
| | | | Center hardness H1 (Shore D) | | 33 | 33 | 33 | 33 | 33 |
| | | | Surface hardness H2 (Shore D) | | 51 | 51 | 51 | 51 | 51 |
| | | | Compression deformation amount (mm) | | 4.7 | 4.7 | 4.7 | 4.7 | 4.7 |
| | Surrounding layer composition No. | | | | 1 | 1 | 1 | 1 | 1 |
| | Thickness (mm) | | | | 4.2 | 4.2 | 4.2 | 4.2 | 4.2 |
| | Properties | Core diameter (mm) | | | 40.8 | 39.0 | 39.8 | 39.8 | 39.8 |
| | | Core surface hardness H3 (Shore D) | | | 61 | 61 | 61 | 61 | 61 |
| | | Hardness difference(H3 − H1) (Shore D) | | | 28 | 28 | 28 | 28 | 28 |
| | | Compression deformation amount (mm) | | | 3.5 | 3.5 | 3.5 | 3.5 | 3.5 |
| Intermediate layer | Intermediate layer composition No. | | | | C | C | C | C | C |
| | Density | g/cm³ | | | 1.22 | 1.22 | 1.22 | 1.22 | 1.22 |
| | Thickness | (mm) | | | 0.8 | 0.8 | 0.8 | 0.8 | 0.8 |
| Cover composition | Formulation | (B) | SURLYN 8945 | | 30 | 30 | 40 | 5 | — |
| | | | HIMILAN AM7329 | | 40 | 40 | 57 | 10 | — |
| | | | SURLYN 8140 | | — | — | — | — | 40 |
| | | | SURLYN 9120 | | — | — | — | — | 60 |
| | | (A) | NOVAMID ST220 | | 30 | 30 | 3 | 85 | — |
| | | | AMILAN U141 | | — | — | — | — | — |
| | | (C) | LOTADER AX8840 | | 5 | 5 | 5 | 5 | — |
| | | | ARUFON UG-4030 | | — | — | — | — | — |
| | | Titanium oxide | | | 3 | 3 | 3 | 3 | 3 |
| | | Ultra marine blue | | | 0.04 | 0.04 | 0.04 | 0.04 | 0.04 |
| | Slab Properties | Slab hardness H5 (Shore D) | | | 67 | 67 | 64 | 76 | 67 |
| | | Bending modulus (MPa) | | | 460 | 460 | 360 | 700 | 430 |
| | | Tensile modulus (MPa) | | | 570 | 570 | 380 | 890 | 512 |
| | | Cover thickness (mm) | | | 0.2 | 1.1 | 0.7 | 0.7 | 0.7 |
| Golf ball evaluation | Compression deformation amount (mm) | | | | 3.4 | 3.0 | 3.3 | 3.1 | 3.2 |
| | Flight distance (m) | | | | 238 | 231 | 229 | 235 | 231 |
| | Direction stability (m) | | | | 3.6 | 4.0 | 4.3 | 3.9 | 4.1 |
| | Normal-temperature Durability | | | | 102 | 129 | 104 | 98 | 100 |
| | Low-temperature Durability | | | | 103 | 132 | 106 | 99 | 100 |
| | Shot feeling | | | | E | G | E | P | F |

TABLE 17

| | | | | Golf ball No. | 44 | 45 | 46 | 47 |
|---|---|---|---|---|---|---|---|---|
| Core | Center composition No. | | | | 1 | 1 | 3 | 2 |
| | Center | Diameter (mm) | | | 31.4 | 31.4 | 35.5 | 25.0 |
| | | Center hardness H1 (Shore D) | | | 33 | 33 | 33 | 32 |
| | | Surface hardness H2 (Shore D) | | | 51 | 51 | 51 | 50 |
| | | Compression deformation amount (mm) | | | 4.7 | 4.7 | 4.5 | 4.7 |
| | Surrounding layer composition No. | | | | 1 | 1 | 1 | 3 |
| | Thickness (mm) | | | | 4.2 | 4.2 | 2.15 | 7.4 |
| | Properties | Core diameter (mm) | | | 39.8 | 39.8 | 39.8 | 37.8 |
| | | Core surface hardness H3 (Shore D) | | | 61 | 61 | 61 | 40 |
| | | Hardness difference(H3 − H1) (Shore D) | | | 28 | 28 | 28 | 8 |
| | | Compression deformation amount (mm) | | | 3.5 | 3.5 | 3.5 | 4.3 |
| Intermediate layer | Intermediate layer composition No. | | | | C | C | C | C |
| | Density | g/cm³ | | | 1.22 | 1.22 | 1.22 | 1.22 |
| | Thickness | (mm) | | | 0.8 | 0.8 | 0.8 | 0.8 |
| Cover composition | Formulation | (B) | SURLYN 8945 | | 30 | 30 | 30 | 30 |
| | | | HIMILAN AM7329 | | 40 | 40 | 40 | 40 |
| | | | SURLYN 8140 | | — | — | — | — |
| | | | SURLYN 9120 | | — | — | — | — |
| | | (A) | NOVAMID ST220 | | 30 | 30 | 30 | 30 |
| | | | AMILAN U141 | | — | — | — | — |
| | | (C) | LOTADER AX8840 | | — | 25 | 5 | 5 |
| | | | ARUFON UG-4030 | | — | — | — | — |
| | | Titanium oxide | | | 3 | 3 | 3 | 3 |
| | | Ultra marine blue | | | 0.04 | 0.04 | 0.04 | 0.04 |
| | Slab Properties | Slab hardness H5 (Shore D) | | | 68 | 63 | 67 | 67 |
| | | Bending modulus (MPa) | | | 485 | 285 | 460 | 460 |
| | | Tensile modulus (MPa) | | | 600 | 340 | 570 | 570 |
| | | Cover thickness (mm) | | | 0.7 | 0.7 | 0.7 | 0.7 |
| Golf ball evaluation | Compression deformation amount (mm) | | | | 3.2 | 3.3 | 3.2 | 4.0 |
| | Flight distance (m) | | | | 230 | 231 | 231 | 228 |
| | Direction stability (m) | | | | 3.8 | 6.1 | 7.2 | 4.2 |
| | Normal-temperature Durability | | | | 95 | 129 | 120 | 125 |
| | Low-temperature Durability | | | | 90 | 139 | 129 | 129 |
| | Shot feeling | | | | P | E | E | E |

Notes on tables 13 to 17
Formulation: parts by mass

Details of the materials are described in Notes on tables 4 to 8.

Each of Golf balls No. 24 to 38 is the case that the cover is formed from the cover composition that contains (A) component, (B) component, and (C) component in a specific amount, wherein the cover has a thickness ranging from 0.3 mm to 1.0 mm, the cover composition has a slab hardness H5 from 65 to 75, and the hardness difference (H3−H1) between the surface hardness H3 of the core and the center hardness H1 of the core is 10 or more in Shore D hardness. It is obvious that golf balls No. 24 to 38 have improved flight distance, direction stability, durability at normal and low temperatures, and shot feeling, if compared to the golf ball No. 43 that has a cover formed from the cover composition consisting of an ionomer resin as a resin component. If the golf ball No. 25 is compared to the golf ball No. 33, the intermediate layer composition having a higher density provides better direction stability. It is noted that the golf ball No. 29 is slightly inferior in the shot feeling, because the cover composition has a high slab hardness.

Golf ball No. 39 is the case that the cover has a thickness less than 0.3 mm. The improved effect of the durability at normal and low temperatures was small, although the flight distance and the shot feeling were excellent. Golf ball No. 40 is the case that the cover has a thickness more than 1.0 mm. The shot feeling was slightly inferior, although the durability at normal and low temperatures were excellent.

Golf ball No. 41 is the case that the cover composition has a slab hardness H5 less than 65 in Shore D hardness. The flight distance was not improved, although the durability at normal and low temperatures and the shot feeling were improved. Golf ball No. 42 is the case the cover composition has a slab hardness H5 more than 75 in Shore D hardness. The shot feeling was poor, although the flight distance was excellent.

Golf ball No. 44 is the case that the cover composition does not contain the (C) component. The flight distance and the durability at normal and low temperatures were all inferior. Golf ball No. 45 is the case that the content of the (C) component was more than 20 parts by mass with respect to 100 parts by mass of a sum of the (A) component and (B) component. The flight distance was not improved and the direction stability were inferior, although the durability at normal and low temperatures and the shot feeling were excellent.

Golf ball No. 46 is the case that the center has a diameter of more than 35 mm. The flight distance was not improved and the direction stability were inferior, although the durability at normal and low temperatures and the shot feeling were excellent. Golf ball No. 47 is the case that the hardness difference (H3−H1) is less than 10 in Shore D hardness. The flight distance was inferior, although the direction stability, the durability at normal and low temperatures and the shot feeling were excellent.

According to the present invention, a golf ball excellent in the durability at the normal and low temperatures, flight distance, direction stability and shot feeling on the shots is obtained.

This application is based on Japanese Patent applications No. 2008-262043 filed on Oct. 8, 2008, and No. 2008-267913 filed Oct. 16, 2008, the contents of which are hereby incorporated by reference

The invention claimed is:

1. A golf ball comprising:
a core consisting of at least one layer;
an intermediate layer covering the core; and
a cover covering the intermediate layer and having a thickness ranging from 0.3 mm to 1.0 mm,
wherein the cover is formed from a cover composition that contains as a resin component
(A) a highly elastic polyamide resin having a flexural modulus in a range from 700 MPa to 5,000 MPa;
(B) a metal-neutralized product of ethylene-(meth)acrylic acid binary copolymer and/or a metal-neutralized product of ethylene-(meth)acrylic acid-(meth)acrylic acid ester ternary copolymer in an amount ratio ((A)/(B)) of (A) the highly elastic polyamide resin to (B) the metal-neutralized product of the binary copolymer and/or the ternary copolymer being (5 mass % to 80 mass %)/(95 mass % to 20 mass %) (the total is 100 mass %); and
(C) a resin having a polar functional group in an amount of 0.1 part by mass to 20 parts by mass with respect to 100 parts by mass of a sum of (A) the highly elastic polyamide resin and (B) the metal-neutralized product of the binary copolymer and/or the ternary copolymer, and
wherein the cover composition has a slab hardness ranging from 65 to 75 in Shore D hardness, and
wherein a surface hardness (H3) of the core and a slab hardness (H4) of the intermediate layer composition constituting the intermediate layer satisfy an equation H3>H4.

2. The golf ball according to claim 1, wherein the intermediate layer has a density of 1.10 g/cm³ or more.

3. The golf ball according to claim 1, wherein regarding slab properties, the cover composition has a flexural modulus in a range from 300 MPa to 1,000 MPa, and a tensile modulus in a range from 400 MPa to 1,500 MPa.

4. The golf ball according to claim 1, wherein (A) the highly elastic polyamide resin is at least one member selected from the group consisting of polyamide 6, polyamide 11, polyamide 12, polyamide 66, polyamide 610, polyamide 6T, polyamide 6I, polyamide 9T, polyamide MST, polyamide 612 and a polyetherblock amide copolymer.

5. The golf ball according to claim 1, wherein (C) the resin having a polar functional group is at least one member selected from a group consisting of an ethylene-glycidyl methacrylate copolymer, an ethylene-acrylic acid-glycidyl methacrylate copolymer, and a methyl methacrylate-glycidyl methacrylate copolymer.

6. The golf ball according to claim 1, wherein the core has a diameter of 39.1 mm or more.

7. The golf ball according to claim 1, wherein (A) the highly elastic polyamide resin has a brittle temperature of −20° C. or less.

8. The golf ball according to claim 1, wherein a degree of neutralization of acidic groups contained in (B) the metal neutralized copolymer ranges from 20 mole % to 90 mole %.

9. The golf ball according to claim 1, wherein (B) the metal neutralized copolymer has a flexural modulus ranging from 250 MPa to 1,000 MPa.

10. A golf ball comprising:
a core consisting of a center having a diameter of 35 mm or less and a surrounding layer covering the center;
at least one intermediate layer covering the core; and
a cover covering the intermediate layer and having a thickness ranging from 0.3 mm to 1.0 mm,
wherein the cover is formed from a cover composition that contains as a resin component
(A) a highly elastic polyamide resin having a flexural modulus in a range from 700 MPa to 5,000 MPa;
(B) a metal-neutralized product of ethylene-(meth)acrylic acid binary copolymer and/or a metal-neutralized product of ethylene-(meth)acrylic acid-(meth)acrylic acid ester ternary copolymer in an amount ratio ((A)/(B)) of (A) the highly elastic polyamide resin to (B) the metal-neutralized product of the binary copolymer and/or the ternary copolymer being (5 mass % to 80 mass %)/(95 mass % to 20 mass %) (the total is 100 mass %); and (C) a resin having a polar functional group in an amount of 0.1 part by mass to 20 parts by mass with respect to 100 parts by mass of a sum of (A) the highly elastic polyamide resin and (B) the metal-neutralized product of the binary copolymer and/or the ternary copolymer, and wherein the cover composition has a slab hardness ranging from 65 to 75 in Shore D hardness and a hardness difference (H3−H1) between a surface hardness (H3) of the core and a center hardness (H1) of the core is 10 or more in Shore D hardness.

11. The golf ball according to claim 10, wherein the intermediate layer has a density of 1.10 g/cm$^3$ or more.

12. The golf ball according to claim 10, wherein the cover composition has a flexural modulus in a range from 300 MPa to 1,000 MPa and a tensile strength in a range from 400 MPa to 1,500 MPa in Slab properties.

13. The golf ball according to claim 10, wherein (A) the highly elastic polyamide resin is at least one member selected from the group consisting of polyamide 6, polyamide 11, polyamide 12, polyamide 66, polyamide 610, polyamide 6T, polyamide 6I, polyamide 9T, polyamide MST, polyamide 612 and a polyetherblock amide copolymer.

14. The golf ball according to claim 10, wherein (C) the resin having a polar functional group is at least one member selected from a group consisting of an ethylene-glycidyl methacrylate copolymer, an ethylene-acrylic acid-glycidyl methacrylate copolymer, and a methyl methacrylate-glycidyl methacrylate copolymer.

15. The golf ball according to claim 10, wherein a center hardness (H1) of the core, a slab hardness (H4) of the intermediate layer, and a surface hardness (H3) of the core satisfy an equation H1<H4<H3.

16. The golf ball according to claim 10, wherein a center composition for forming the center and a surrounding layer composition for forming the surrounding layer comprise a rubber component as a main component, and an intermediate layer composition for forming the intermediate layer comprises a thermoplastic material as a main component.

17. The golf ball according to claim 10, wherein (A) the highly elastic polyamide resin has a brittle temperature of −20° C. or less.

18. The golf ball according to claim 10, wherein a degree of neutralization of acidic groups contained in (B) the metal neutralized copolymer ranges from 20 mole % to 90 mole %.

19. The golf ball according to claim 10, wherein (B) the metal neutralized copolymer has a flexural modulus ranging from 250 MPa to 1,000 MPa.

* * * * *